United States Patent
Ryu et al.

(10) Patent No.: US 11,729,842 B2
(45) Date of Patent: Aug. 15, 2023

(54) SYSTEMS AND METHODS FOR COORDINATING USER EQUIPMENT (UE) DIRECT COMMUNICATION IN A COMMUNICATION SYSTEM

(71) Applicant: QUALCOMM INCORPORATED, San Diego, CA (US)

(72) Inventors: Jung Ho Ryu, Fort Lee, NJ (US); Tianyang Bai, Bridgewater, NJ (US); Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/930,330

(22) Filed: May 12, 2020

(65) Prior Publication Data

US 2020/0367299 A1 Nov. 19, 2020

Related U.S. Application Data

(60) Provisional application No. 62/847,782, filed on May 14, 2019.

(51) Int. Cl.
*H04W 4/00* (2018.01)
*H04W 76/14* (2018.01)
(Continued)

(52) U.S. Cl.
CPC .......... *H04W 76/14* (2018.02); *H04B 17/318* (2015.01); *H04B 17/336* (2015.01); *H04W 8/005* (2013.01); *H04W 16/28* (2013.01)

(58) Field of Classification Search
None
See application file for complete search history.

(56) References Cited

U.S. PATENT DOCUMENTS

2015/0282143 A1* 10/2015 Kim .................. H04W 72/0406
370/329
2017/0195998 A1* 7/2017 Zhang .................. H04L 5/0057
(Continued)

FOREIGN PATENT DOCUMENTS

WO  2018145566 A1  8/2018
WO  2019078661 A1  4/2019

OTHER PUBLICATIONS

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600771, 9 pages, Retrieved from the Internet URL: http://www.3gpp.org/ftp/tsg%5Fran/WG1%5FRL1/TSGR1%5F96/Docs/R1%2D1903075%2Ezip. [retrieved on Feb. 15, 2019] p. 2.

(Continued)

*Primary Examiner* — Bob A Phunkulh
(74) *Attorney, Agent, or Firm* — Smith Tempel Blaha LLC/Qualcomm Incorporated

(57) ABSTRACT

Communication beam selection and management in a communication system is disclosed in which a first, or initiating, user equipment (UE), and a second, or target, UE, establish a direct communication link between them. The initiating UE may transmit a request to a serving base station, which may then communicate with a serving base station of the target UE to schedule one or more communication beams, and/or time and frequency resources, that the initiating UE and the target UE may use to perform direct beam search.

26 Claims, 21 Drawing Sheets

(51) Int. Cl.
　　　*H04W 8/00*　　　(2009.01)
　　　*H04W 16/28*　　(2009.01)
　　　*H04B 17/336*　　(2015.01)
　　　*H04B 17/318*　　(2015.01)

(56) References Cited

U.S. PATENT DOCUMENTS

2017/0196013 A1* 7/2017 Shin .................. H04W 76/14
2019/0372647 A1  12/2019 Su et al.
2021/0028850 A1*  1/2021 Elliott ................ H04B 7/0695

OTHER PUBLICATIONS

International Search Report and Written Opinion—PCT/US2020/032552—ISA/EPO—dated Jul. 8, 2020.

Spreadtrum Communications: "Considerations on Beam-Based Transmission for Sidelink", 3GPP Draft, 3GPP TSG RAN WG1 Meeting #94bis, R1-1811003, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518407, 2 pages, Retrieved from the Internet: URL: http://www.3gpp.org/ftp/tsg%5Fran/WG1%5FRL1/TSGR1%5F94b/Docs/R1%2DI811003%2Ezip. [retrieved on Feb. 15, 2019].

VIVO: "Enhancements or UU Link to Control Sldelink", 3GPP Draft, 3GPP TSG RAN WG1 Ad-Hoc Meeting 1901, R1-1900122, Enhancements of UU Link to Control Sidelink, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 12, 2019 (Jan. 12, 2019), XP051575746, 8 pages, Retrieved from the Internet: URL: http://www.3gpp.org/ftp/tsg%5Fran/WG1%5FRL1/TSGR1%5FAH/NR%5FAH%5F1901/Docs/R1%2D1900122%2Ezip. [retrieved on Feb. 15, 2019].

* cited by examiner

Device-to-Device
Communication System

SYSTEMS AND METHODS FOR COORDINATING USER EQUIPMENT (UE) DIRECT COMMUNICATION IN A COMMUNICATION SYSTEM

RELATED APPLICATIONS

This application claims priority to and the benefit of U.S. Provisional Patent Application No. 62/847,782, entitled "SYSTEMS AND METHODS FOR COORDINATING USER EQUIPMENT (UE) DIRECT COMMUNICATION IN A COMMUNICATION SYSTEM," filed May 14, 2019, the contents of which are hereby incorporated herein by reference in its entirety as if fully set forth below and for all applicable purposes.

TECHNICAL FIELD

The technology discussed below relates to wireless communication systems, and more particularly to systems and methods for base station coordinated user equipment (UE) direct communication beam selection and management in a communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement to LTE technology is referred to as 5G or new radio (NR). The terms 5G and NR represents an advancement of LTE technology including, for example, various advancements to the wireless interface, processing improvements, and the enablement of higher bandwidth to provide additional features and connectivity.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). In certain circumstances, it may be desirable for a UE to communicate directly with another UE. However, coordinating the selection of communication beams in a millimeter wave (mmW) communication system presents challenges because the UEs may be in motion and the communication channel between UEs may be highly dynamic, and the UEs may be coupled to different base stations.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication by an initiating communication device (UE1) including transmitting, by the initiating communication device (UE1) to a serving base station (gNB1) of the initiating communication device (UE1), a request to establish a direct link communication with a target communication device (UE2), the request comprising information relating to the initiating communication device's (UE1) capability for direct link communication, and information identifying the target communication device (UE2), receiving information identifying a plurality of communication beams to be used for direct beam search between the initiating communication device (UE1) and the target communication device (UE2), and performing direct beam search with the target communication device (UE2).

Another aspect of the disclosure provides a method for communication by a serving base station (gNB1) of an initiating communication device (UE1) including receiving a request from the initiating communication device (UE1) to establish a direct communication link with a target communication device (UE2), the request comprising information relating to the initiating communication device's (UE1) capability for direct link communication, and information identifying the target communication device (UE2), notifying a serving base station (gNB2) of the target communication device (UE2) of the request for the direct communication link, and transmitting information identifying a plurality of communication beams to be used for direct beam search between the initiating communication device (UE1) and the target communication device (UE2).

Another aspect of the disclosure provides a method for communication by a target communication device (UE2) including receiving a notification of a request for a direct link communication with an initiating communication device (UE1), sending direct communication link capability of the target communication device (UE2) to a base station (gNB2) of the target communication device (UE2), receiving information identifying a plurality of communication beams to be used for the direct beam search with the initiating communication device (UE1), and performing direct beam search with the initiating communication device (UE1).

Another aspect of the disclosure provides an apparatus for communication including a memory in an initiating communication device (UE1), a processor in the UE1, the memory and the processor of the initiating communication device (UE1) configured to transmit, by the initiating communication device (UE1) to a serving base station (gNB1) of the initiating communication device (UE1), a request to establish a direct link communication with a target communication device (UE2), the request comprising information relating to the initiating communication device's (UE1) capability for direct link communication, and information identifying the target communication device (UE2), the memory and the processor of the initiating communication device (UE1) configured to receive information identifying a plurality of communication beams to be used for direct beam search between the initiating communication device (UE1) and the target communication device (UE2), and the memory and the processor of the initiating communication device (UE1) configured to perform direct beam search with the target communication device (UE2).

Another aspect of the disclosure provides an apparatus for communication including a memory in a target communication device (UE2), a processor in the target communication device UE2, the memory and the processor of the target communication device (UE2) configured to receive a notification of a request for a direct link communication with an initiating communication device (UE1), the memory and the processor of the target communication device (UE2) configured to send direct communication link capability of the target communication device (UE2) to a serving base station (gNB2) of the target communication device (UE2), the memory and the processor of the target communication device (UE2) configured to receive information identifying a plurality of communication beams to be used for the direct beam search with the initiating communication device (UE1), and the memory and the processor of the target communication device (UE2) configured to perform direct beam search with the initiating communication device (UE1).

Other aspects of the disclosure provide means, apparatus, and/or computer-readable medium having code configured to perform the steps of the methods above.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
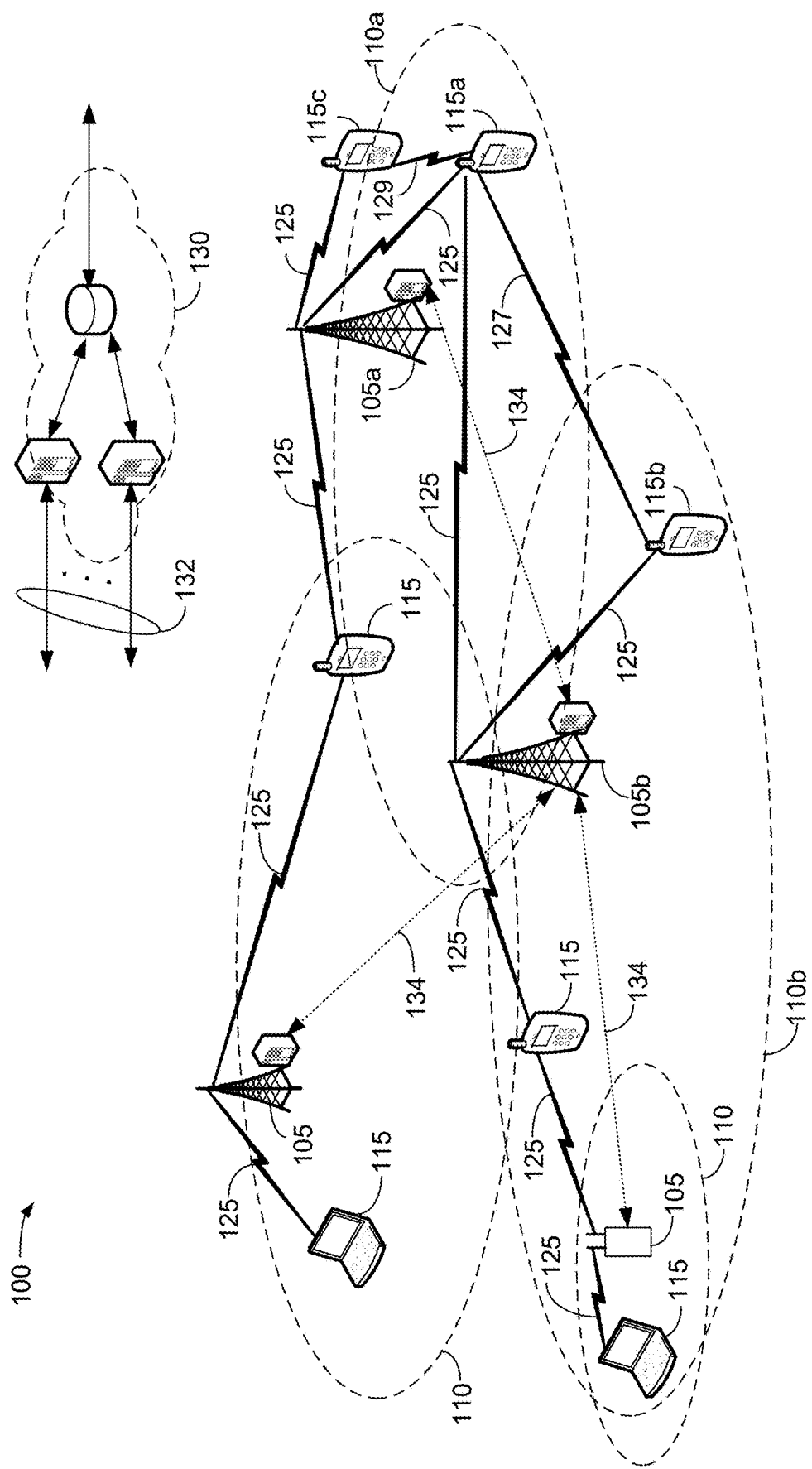
FIG. 1 illustrates an example of a wireless communications system in accordance with various aspects of the disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to communication beam selection and management in a communication system in which a first UE, also referred to as an initiating UE, and a second UE, also referred to as a target UE, establish a direct communication link between them. Exemplary embodiments of the disclosure are directed to communication beam selection and management in a mmW communication system in which beamforming systems are used to establish a communication link between communication devices. The communication devices may be coupled to the same or to different base stations. In an exemplary embodiment, a base station and a UE, and/or first and second UEs may communicate using directional communication beams.

In an exemplary embodiment, a first UE and a second UE may be in communication with respective first and second base stations. The base stations may be capable of LTE communication and/or mmW communication. In an exemplary embodiment, one or more of the base stations may be 5G base stations, also referred to as a gNodeB (gNB). Because of the dynamic nature of the communication channel due to device movement, interference, and other dynamic parameters, the directional communication beams used by a UE to communicate directly with another UE may change over time. Moreover, the properties of the directional communication beams may change over time, thus making it desirable to have a way to establish and maintain a direct communication link between the communication devices.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, base stations 105 may communicate, either directly or indirectly (e.g., through core network 130), with each other over a second set of backhaul links 134 (e.g., X1, etc.), which may be wired or wireless communication links.

Each base station site may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a gNodeB (gNB), or some other suitable terminology. The geographic coverage area 110 for a base station 105 may be divided into sectors making up only a portion of the coverage area (not shown). Wireless communications system 100 may include base stations 105 of different types (e.g., macro and/or small cell base stations). There may be overlapping geographic coverage areas 110 for different technologies.

In some examples, wireless communications system 100 may be one or more of an LTE/LTE-A network and a 5G network. In LTE/LTE-A networks, the term evolved Node B (eNB) or in a 5G (also referred to as new radio (NR)) network, the term millimeter wave B (mWB), or gNodeB (gNB) may be generally used to describe base stations 105, while the term UE may be generally used to describe UEs 115. Wireless communications system 100 may be a heterogeneous LTE/LTE-A and 5G network in which different types of eNBs and/or mWBs provide coverage for various geographical regions. For example, each eNB, mWB, gNB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include a millimeter wave (mmW) communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support synchronous or asynchronous operation. For synchronous operation, base stations 105 may have similar frame timing, and transmissions from different base stations may be approximately aligned in time. For asynchronous operation, base stations 105 may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a vehicle, a drone, an autonomous vehicle, an Internet of Things (IoT) device, a factory automation device, or the like. A UE 115 may be able to communicate with various types of base stations and network equipment including macro eNBs, small cell eNBs, gNBs, mWBs, relay base stations, and the like. A UE 115 may also be able to communicate with other UEs either within or outside the same coverage area of a base station via D2D communications. A UE 115a coupled to a particular base station 105a may be able to communicate directly with another UE 115b coupled to a different base station 105b, with such an exemplary communication link shown as communication link 127. In an alternative exemplary embodiment, a UE 115c coupled to a particular base station 105a may be able to communicate directly with another UE 115a coupled to the same base station 105a, with such an exemplary communication link shown as communication link 129.

In some examples, a UE 115 may be served by multiple base stations. For example, a UE 115a may be served by the base station 105a and by the base station 105b. In an exemplary embodiment, the base station 105a may be referred to as a primary base station, and the coverage area 110a may be referred to as a primary cell (PCell); and the base station 105b may be referred to as a secondary base station, and the coverage area 110b may be referred to as a secondary cell (SCell). In such an example, the base station 105a may be referred to as a master gNB (MgNB) and the base station 105b may be referred to as a secondary gNB (SgNB). However, in an alternative exemplary embodiment, any of the base stations 105 may be a MgNB and/or a SgNB. In such an example, the UE 115a and the UE 115b may be served by one or more of the base station 105a (MgNB) and the base station 105b (SgNB). In the exemplary embodiment shown, the UE 115a may be served by both the base station 105a (MgNB) and by the base station 105b (SgNB), and the UE 115b may be served by the base station 105b (SgNB).

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Direct communication between UEs 115 may also be accomplished over communication links 127.

In some examples, base stations 105 and/or UEs 115 may include multiple antennas for employing antenna diversity schemes to improve communication quality and reliability between base stations 105 and UEs 115. Additionally, or alternatively, base stations 105 and/or UEs 115 may employ multiple-input, multiple-output (MIMO) techniques that may take advantage of multi-path environments to transmit multiple spatial layers carrying the same or different coded data.

The modulation and multiple access scheme employed by the communications system 100 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE and 5G applications. However, these concepts may be readily extended to other telecommunication standards employing other modulation and multiple access techniques. By way of example, these concepts may be extended to Evolution-Data Optimized (EV-DO), Ultra Mobile Broadband (UMB), or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA)

employing Wideband-CDMA (W-CDMA) and other variants of CDMA, such as TD-SCDMA; Global System for Mobile Communications (GSM) employing TDMA; and Evolved UTRA (E-UTRA), Institute of Electrical and Electronics Engineers (IEEE) 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 105 may have multiple antennas supporting MIMO technology. The use of MIMO technology enables the base stations 105 to exploit the spatial domain to support spatial multiplexing, beamforming, and transmit diversity. Spatial multiplexing may be used to transmit different streams of data simultaneously on the same frequency. The data streams may be transmitted to a single UE 115 to increase the data rate or to multiple UEs 115 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 115 with different spatial signatures, which enables each of the UE(s) 115 to recover the one or more data streams destined for that UE 115. On the UL, each UE 115 transmits a spatially precoded data stream, which enables the base stations 105 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 2:
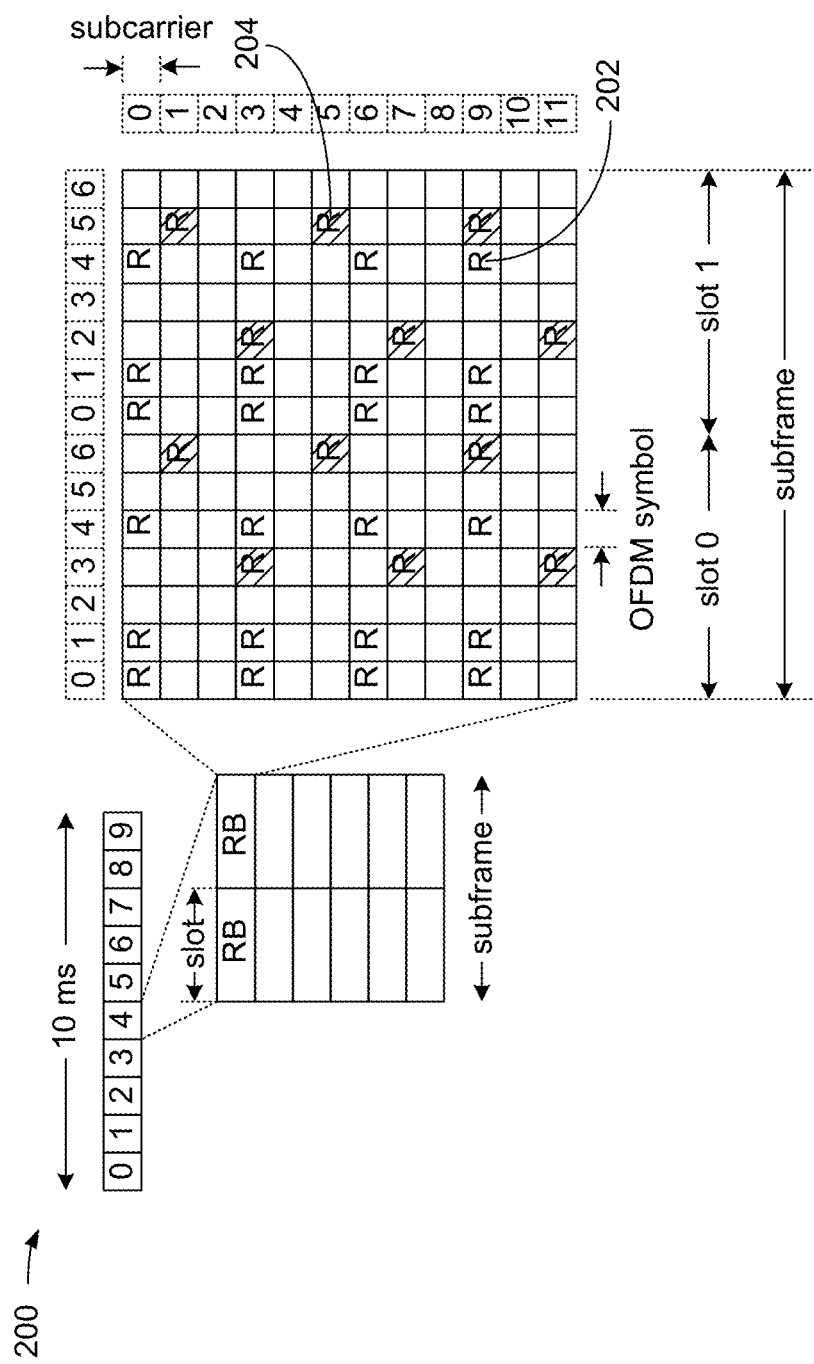
FIG. 2 is a diagram illustrating an example of a DL frame structure in LTE, in accordance with various aspects of the present disclosure.

FIG. 2 is a diagram 200 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 202, 204, include DL reference signals (DL-RS). The DL-RS include Cell-specific RS (CRS) (also sometimes called common RS) 202 and UE-specific RS (UE-RS) 204. UE-RS 204 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 3:
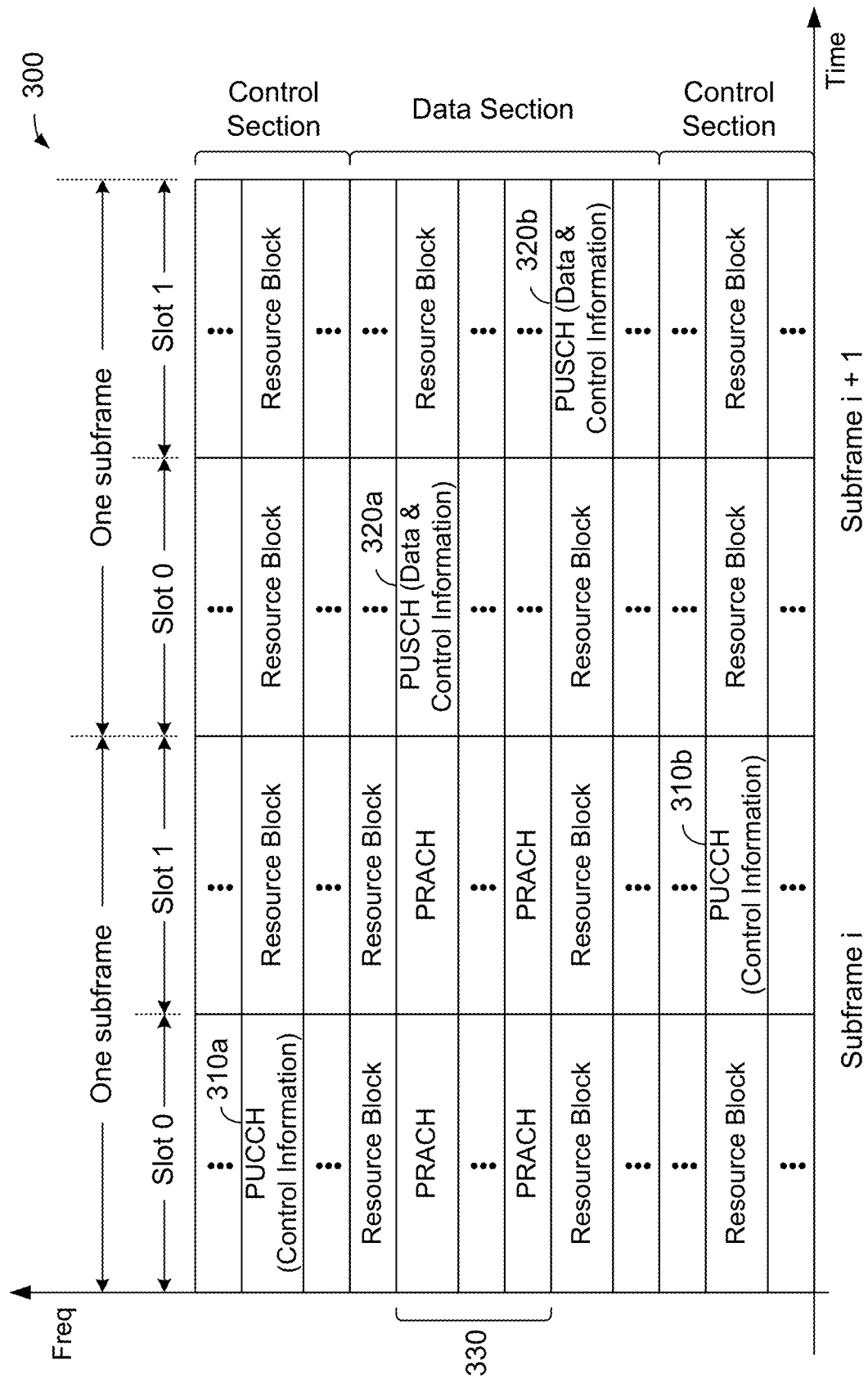
FIG. 3 is a diagram illustrating an example of an UL frame structure in LTE, in accordance with various aspects of the present disclosure.

FIG. 3 is a diagram 300 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to an eNB/gNB. The UE may also be assigned resource blocks 320a, 320b in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 4:
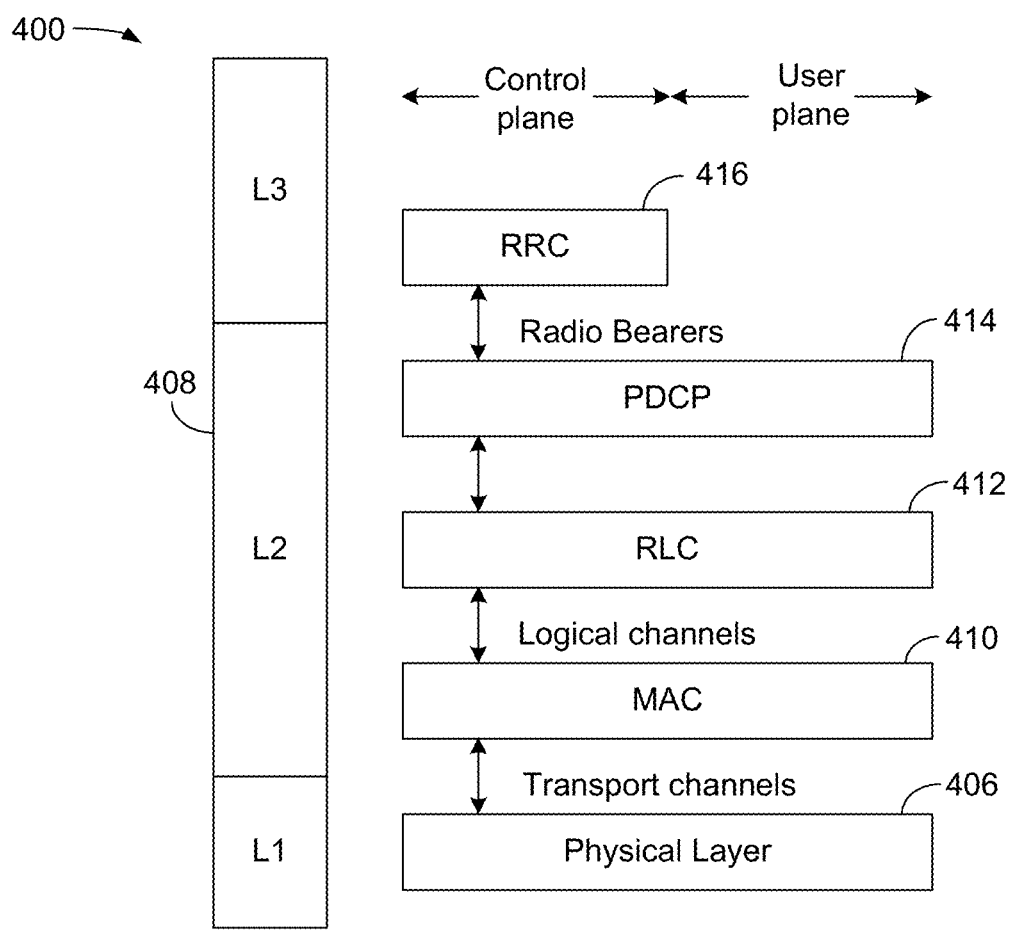
FIG. 4 is a diagram illustrating an example of a radio protocol architecture for the user and control planes in accordance with various aspects of the present disclosure.

FIG. 4 is a diagram 400 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at a packet data network (PDN) gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (e.g., radio bearers) and for configuring the lower layers using RRC signaling between the eNB and the UE.

In an exemplary embodiment, at least the MAC sublayer 410, the RLC sublayer 412, and the PHY layer 406 may be configured to perform the UE to UE signaling and communication. Furthermore, the MAC sublayer 410, the RLC sublayer 412, and the PHY layer 406 may also be configured to perform the UE to base station signaling and communication described herein as part of configuring a UE for the direct beam search and for performing the direct beam search with another UE.

Figure 5:
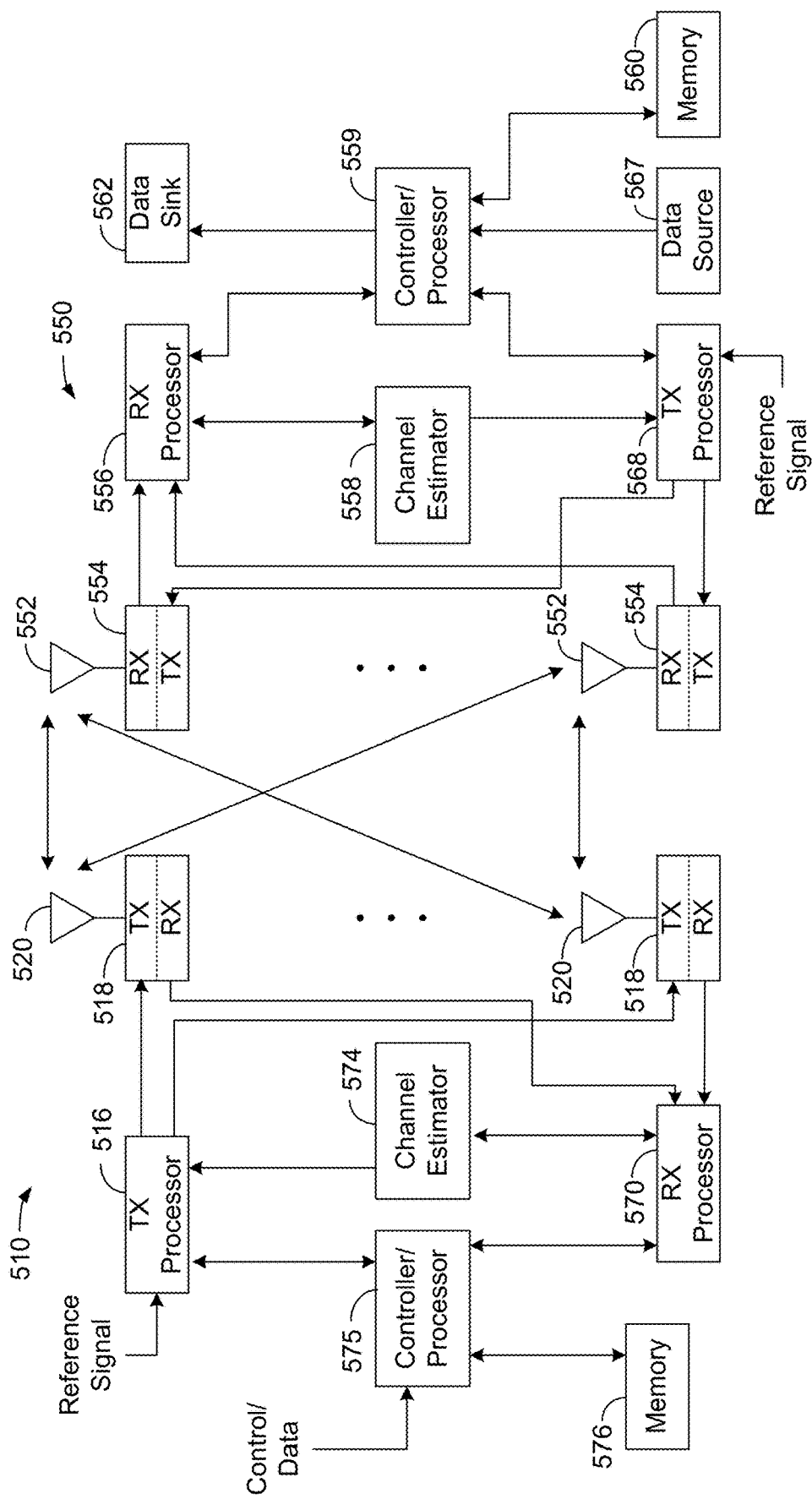
FIG. 5 is a diagram illustrating an example of an evolved Node B and user equipment in an access network in accordance with various aspects of the present disclosure.

FIG. 5 is a block diagram of an eNB/gNB 510 in communication with a UE 550 in an access network in accordance with various aspects of the present disclosure. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions include coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal (RS) and/or channel condition feedback transmitted by the UE 550. Each spatial stream may then be provided to a different antenna 520 via a separate transmitter 518TX. Each transmitter 518TX may modulate a radio frequency (RF) carrier with a respective spatial stream for transmission.

At the UE 550, each receiver 554RX receives a signal through its respective antenna 552. Each receiver 554RX recovers information modulated onto an RF carrier and provides the information to the receive (RX) processor 556. The RX processor 556 implements various signal processing functions of the L1 layer. The RX processor 556 may perform spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB/gNB 510. These soft decisions may be based on channel estimates computed by the channel estimator 558. The soft decisions are then decoded and deinterleaved to recover the data and control signals that were originally transmitted by the eNB/gNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB/gNB 510, the controller/processor 559 implements the L2 layer for the user plane and the control plane by providing header compression, ciphering, packet segmentation and reordering, and multiplexing between logical and transport channels based on radio resource allocations by the eNB/gNB 510. The controller/processor 559 is also responsible for HARQ operations, retransmission of lost packets, and signaling to the eNB/gNB 510.

Channel estimates derived by a channel estimator 558 from a reference signal or feedback transmitted by the eNB/gNB 510 may be used by the TX processor 568 to select the appropriate coding and modulation schemes, and to facilitate spatial processing. The spatial streams generated by the TX processor 568 may be provided to different antenna 552 via separate transmitters 554TX. Each transmitter 554TX may modulate an RF carrier with a respective spatial stream for transmission.

The UL transmission is processed at the eNB/gNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

In an exemplary embodiment, the methods described herein may be performed by the controller/processor 575 and the memory 576 in the eNB/gNB 510 and/or by the controller/processor 559 and the memory 560 in the UE 550.

Figure 6:
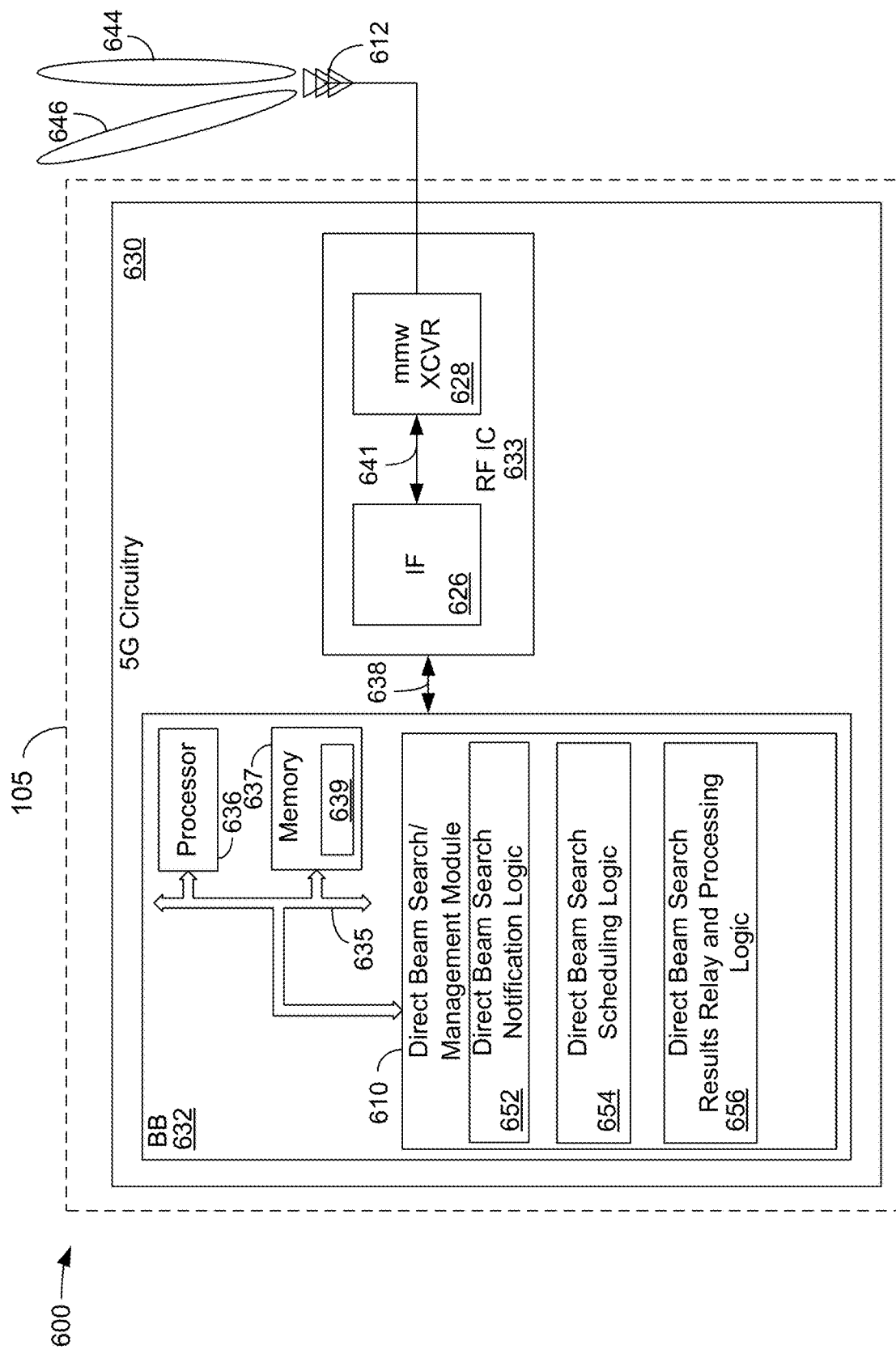
FIG. 6 is a diagram illustrating an example of a processor and memory associated with a base station in accordance with various aspects of the present disclosure.

FIG. 6 is a diagram illustrating an example of a base station 105 having a processor and memory including executable code in accordance with various aspects of the present disclosure. The base station may be an example of a base station 105 of FIG. 1 or a gNB 510 of FIG. 5, and in an exemplary embodiment, may be a gNB. However, in exemplary embodiments, the base station need not be capable of 5G (mmW) communication. In an exemplary embodiment, the base station 105 may comprise 5G circuitry 630, and other communication circuitry (not shown). Some of the operational elements of the 5G circuitry 630 may be omitted for ease of description, and are known to those having ordinary skill in the art.

The base station 105 may generally include components for bi-directional voice and data communications including components for transmitting communications and components for receiving communications. The base station 105 may include an antenna 612 coupled to the 5G circuitry 630. The antenna 612 may comprise one or more antenna elements, may comprise an array, or a phased array, of antenna elements, and may comprise one or more directional and/or omni-directional antenna elements, which may be controlled individually or in groups of two or more elements. The 5G circuitry 630 may be configured to establish a communication channel with a device, such as a UE 115 (not shown). In an exemplary embodiment, the communication channel may comprise a serving beam 644 and one or more target beams 646. As used herein, the term "serving beam" refers to a communication beam that is currently being used for communication and the term "target beam" refers to a communication beam that may be available for communication use, but that is not currently being used for communication.

The 5G circuitry 630 may comprise a baseband system 632 and a radio frequency integrated circuit (RFIC) 633, operatively coupled together over a bi-directional connection 638. The baseband system 632 may comprise a processor 636, a memory 637 (including software (SW) 639), and a direct beam search/management module 610, which may communicate, directly or indirectly, with each other (e.g., via one or more buses 635).

The RFIC 633 may comprise an intermediate frequency (IF) sub-system 626 and a transceiver module 628 operatively coupled together over a bi-directional connection 641. The RFIC 633 may comprise one or more digital components and one or more analog components, such as, for example, phase shifters, switches, or other components configured for beamforming. In an exemplary embodiment, the transceiver module 628 may be configured to communicate over millimeter wave (mmW) frequencies. The transceiver module 628 may communicate bi-directionally, via the antenna(s) 612 and/or one or more wired or wireless links, with one or more networks, as described above. For example, the transceiver module 628 may communicate bi-directionally with base stations 105 and directly with UEs 115 (not shown). One or more of the analog components in the transceiver module 628 may be used when transitioning from one communication beam to another communication beam. In an exemplary embodiment, it may be desirable for a first UE 115a that is coupled to a first base station 105a to communicate directly with a second UE 115b that is coupled to a second base station 105b.

The transceiver module 628 may include a modem to modulate the packets and provide the modulated packets to the antenna(s) 612 for transmission, and to demodulate packets received from the antenna(s) 612. While the base station 105 may include a single antenna 612 the base station 105 may have multiple antennas capable of concurrently transmitting and/or receiving multiple wireless transmissions via carrier aggregation techniques, for example. The transceiver module 628 may be capable of concurrently communicating with one or more UEs 115 via multiple component carriers. Although omitted for clarity, the base station 105 may also include communication capability to communicate with other base stations over, for example, backhaul link 134 (FIG. 1). Some of the elements of the UE 115 of FIG. 6 are similar to, or represent examples of, some of the elements of the eNB/gNB 510 of FIG. 5. For example, the antenna 612 may be similar to the antenna 520; the RF IC 633 may comprise components similar to the transmitter 518TX and the receiver 518RX; the memory 639 may be similar to the memory 576; and the processor 636 may be similar to the controller/processor 575.

The base station 105 may include a direct beam search/management module 610, which may perform the direct beam search and/or management functions described herein. In an exemplary embodiment, the direct beam search/management module 610 may be configured to cooperate with the processor 636 and the memory 637 to allow the base station 105 to communicate with a UE 115 and with another base station 105 to schedule resources that allow a UE 115 to perform a direct beam search with another UE 115 that may be coupled to a different base station 105.

In an exemplary embodiment, the direct beam search/management module 610 may comprise direct beam search notification logic 652 configured to process a direct beam search request received from a UE 115. In an exemplary embodiment, the direct beam search/management module 610 may also comprise a direct beam search scheduling logic 654 and a direct beam search results relay and processing logic 656.

In an exemplary embodiment, the direct beam search scheduling logic 654 may be configured to schedule communication beams and/or time and frequency communication resources for a UE to use for direct beam search with another UE. In an exemplary embodiment, the direct beam search scheduling logic 654 may also be configured to schedule communication beams and/or time and frequency communication resources for a UE to use for direct link communication with another UE after the direct beam search is performed.

As used herein, the term "direct beam search" refers to a process by which a first communication device (such as a first user equipment) and a second communication device (such as a second user equipment) discover communication beams that may be available for direct communication between the first and second communication devices. The terms "direct link communication" and "direct communication link" may refer to the two communication devices communicating directly with each other over the one or more communication beams that were discovered during the direct beam search process.

In an exemplary embodiment, the direct beam search results relay and processing logic 656 may be configured to allow the base station 105 to receive and process a direct beam search report having direct beam search results sent by a UE 115. In an exemplary embodiment, the direct beam search results relay and processing logic 656 may also be configured to relay the direct beam search results to another base station 105 and/or to another UE 115; and to coordinate with another base station the direct link communication between the first communication device and the second communication device.

Although shown as a separate logic elements in FIG. 6, the instructions associated with the logic elements in the direct beam search/management module 610 may be partly or wholly stored in the memory 637 for execution by the processor 636. The logic elements in the direct beam search/management module 610 may be software, firmware, or a combination of software and firmware that can be configured and executed by the processor 636 to perform the functions described herein.

The memory 637 may include random access memory (RAM) and read-only memory (ROM). The memory 637 may store computer-readable, computer-executable software/firmware code 639 containing instructions that, when executed, cause the processor 636 to perform various functions described herein (e.g., perform synchronization operations, synchronize reference timing parameters, beam transition operations, etc.). Alternatively, the computer-readable, computer-executable software/firmware code 639 may not be directly executable by the processor 636 but cause a computer (e.g., when compiled and executed) to perform functions described herein. The processor 636 may include an intelligent hardware device, e.g., a central processing unit (CPU), a microcontroller, an application-specific integrated circuit (ASIC), etc.

Although the logic elements associated with the direct beam search/management module 610 are described in FIG. 6 in a conceptual manner as stored in or residing in the memory 637, persons skilled in the art understand that such logic elements arise through the operation of the processor 636 in accordance with conventional computing device principles. That is, software, firmware, or a combination of software and firmware contributes to programming or configuring the processing system to be characterized by such logic elements. Although the memory 637 is depicted in FIG. 6 as a single or unitary element for purposes of clarity, the memory 637 can be of any suitable type and can have any suitable structure, such as one or more modules, chips, etc. Likewise, although the processor 636 is depicted in FIG. 6 as a single or unitary element for purposes of clarity, the processor 636 can be of any suitable type and can have any suitable structure, such as one or more modules, chips, etc. For example, the processor 636 can comprise one or more microprocessors or microcontrollers. Some or all of the foregoing processing system elements can be provided in, for example, an application-specific integrated circuit (ASIC) or other integrated digital device. It should be understood that the combination of the memory 637 and the above-referenced modules or software, firmware, instructions, etc., underlying the logic elements, as stored in the memory 637 in non-transitory computer-readable form, defines a "computer program product" as that term is understood in the patent lexicon. In view of the descriptions herein, persons skilled in the art will readily be capable of providing suitable software or firmware or otherwise configuring the base station 105 to operate in the manner described. Also, although the effect of each of the above-referenced logic elements is described herein, it should be understood that the effect may result from contributions of two or more logic elements in concert, or from contributions of the logic elements and conventional switch logic elements or other software, hardware, or network elements that are not shown for purposes of clarity.

Figure 7:
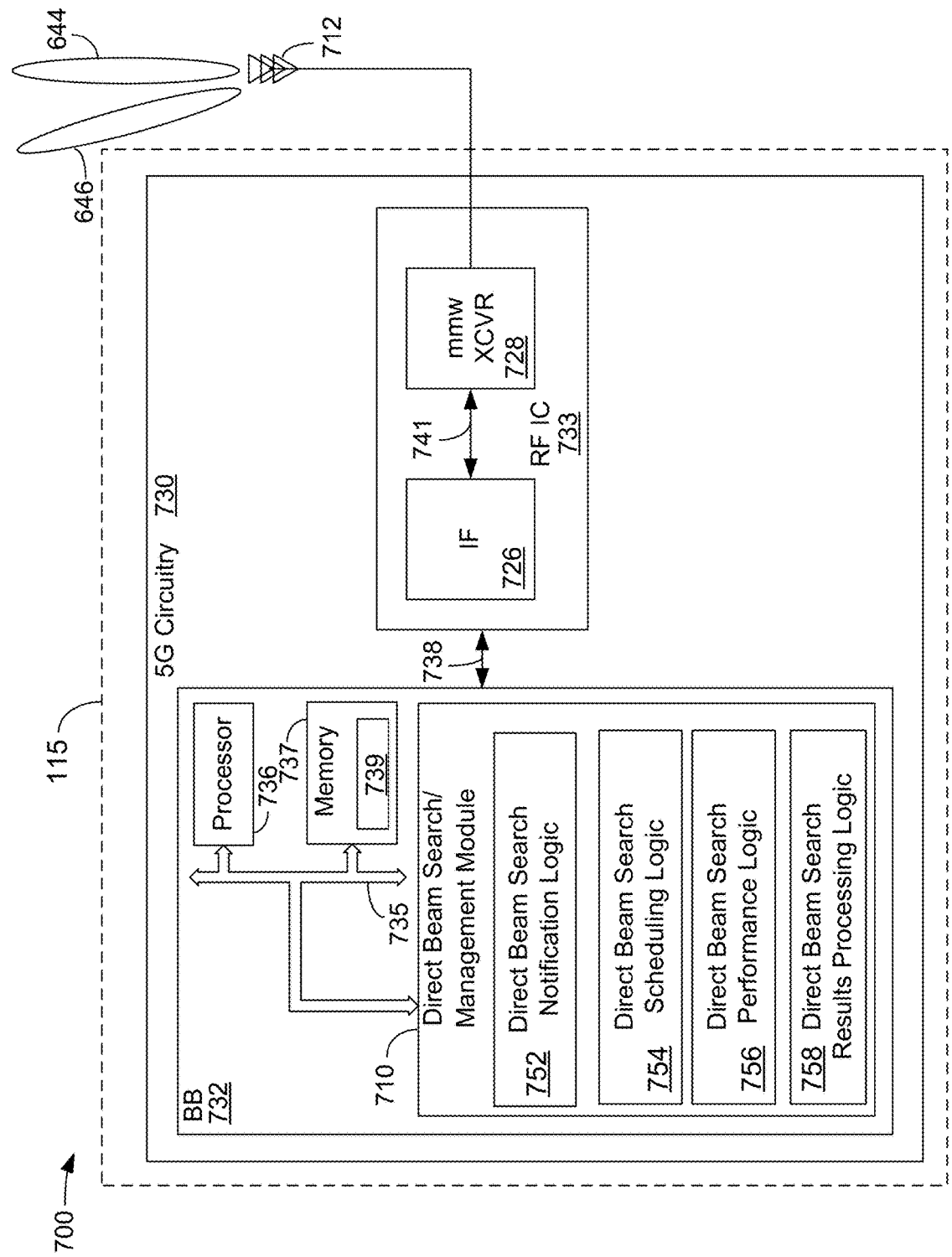
FIG. 7 is a diagram illustrating an example of a processor and memory associated with a user equipment in accordance with various aspects of the present disclosure
Figure 12:
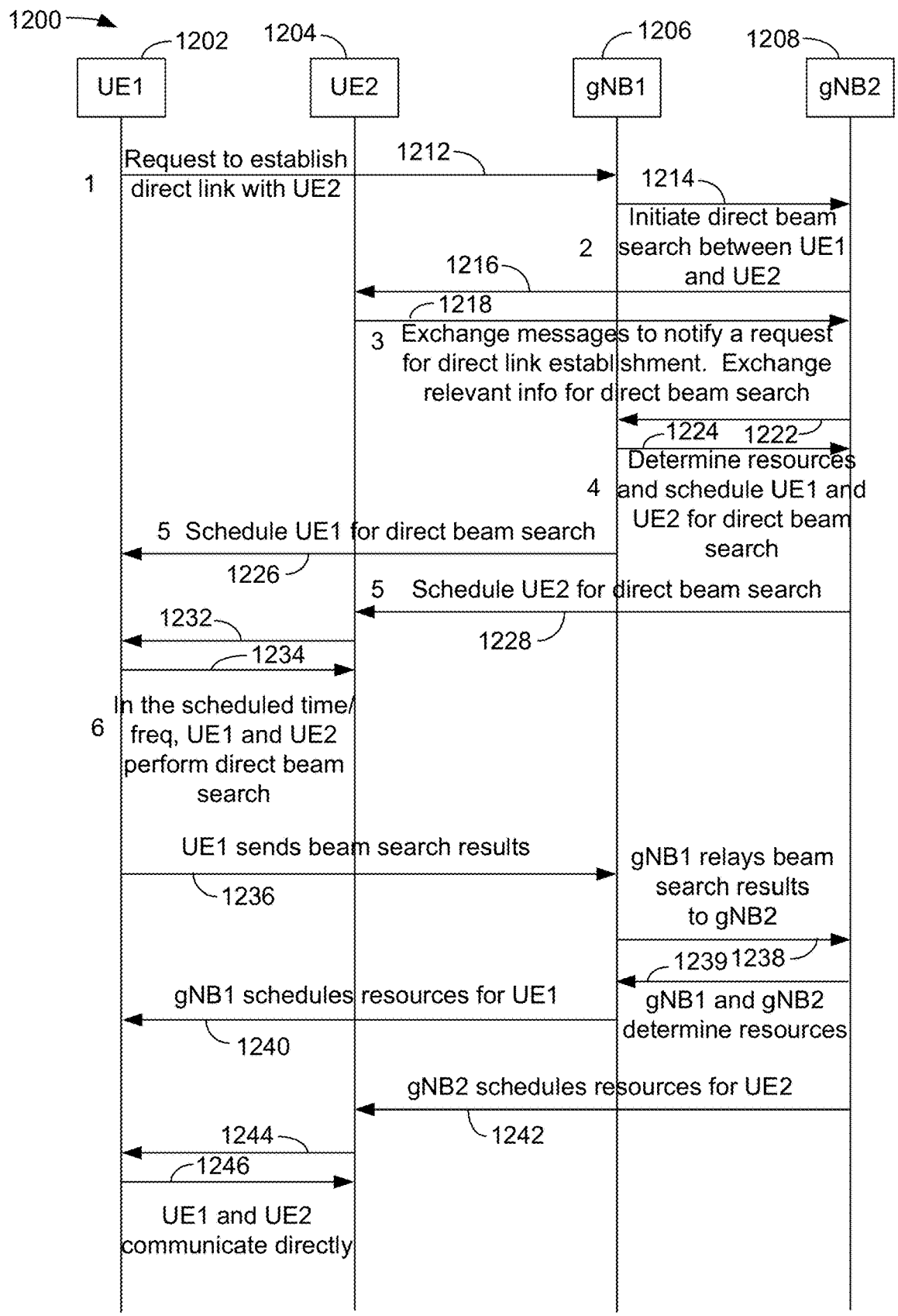
FIG. 12 is a call flow diagram in accordance with various aspects of the present disclosure.
Figure 17:
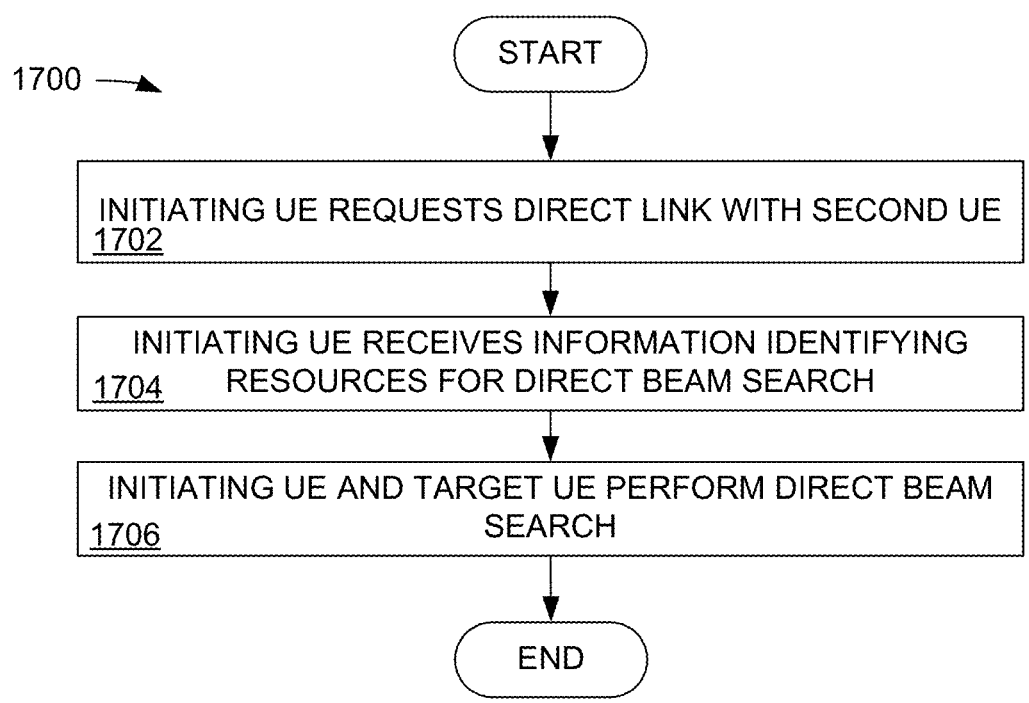
FIG. 17 is a flow chart illustrating an example of a method for communication, in accordance with various aspects of the present disclosure.
Figure 21:
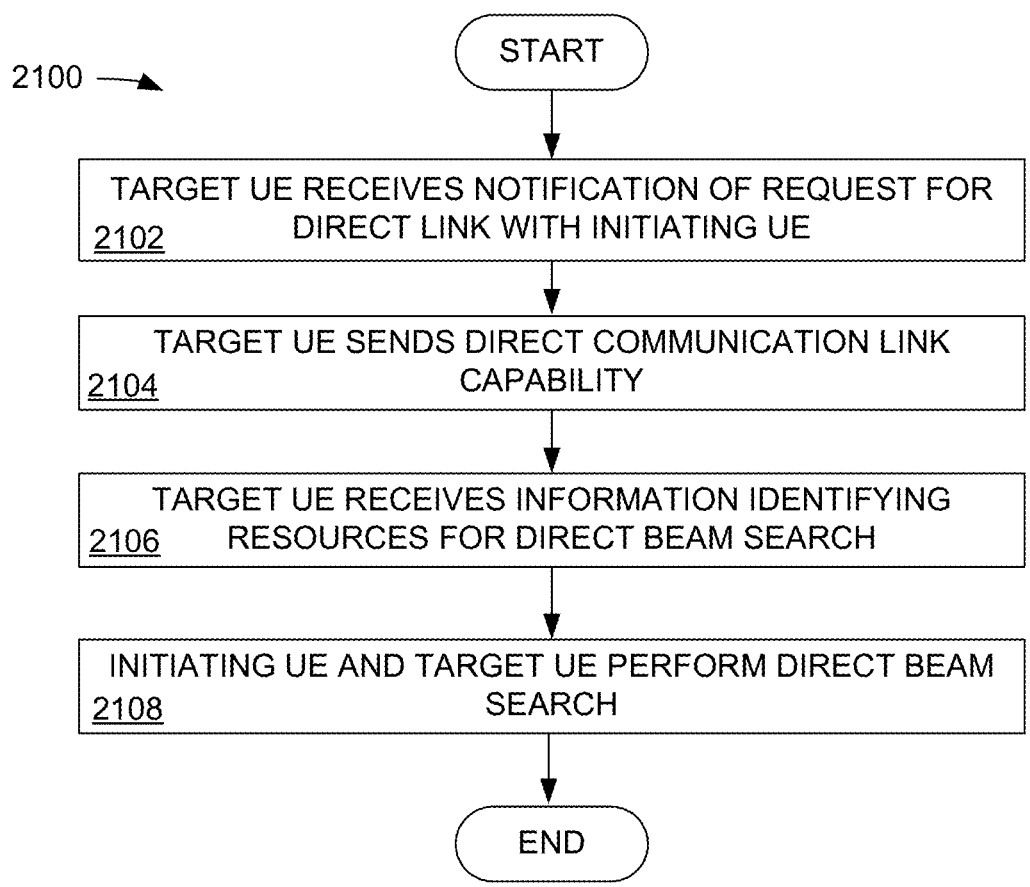
FIG. 21 is a flow chart illustrating an example of a method for communication, in accordance with various aspects of the present disclosure.

FIG. 7 is a diagram illustrating an example of a UE 115 having a processor and memory including executable code in accordance with various aspects of the present disclosure, for example, process flows illustrated in FIGS. 12, 17, and 21. The UE may be an example of a UE 115 of FIG. 1 or a UE 550 of FIG. 5. The UE 115 may comprise 5G circuitry 730, and other communication circuitry (not shown). Some of the operational elements of the 5G circuitry 730 may be omitted for ease of description, and are known to those having ordinary skill in the art.

The UE 115 may generally include components for bi-directional voice and data communications including components for transmitting communications and components for receiving communications. The UE 115 may include an antenna 712 coupled to the 5G circuitry 730. The antenna 712 may comprise one or more antenna elements, may comprise an array, or a phased array, of antenna elements, and may comprise one or more directional and/or omni-directional antenna elements, which may be controlled individually or in groups of two or more elements. The 5G circuitry 730 may be configured to establish a 5G communication channel with a device, such as a base station 105 (not shown) or another UE 115 (not shown). In an exemplary embodiment, the communication channel may comprise a serving beam 644 and one or more target beams 646, as described herein.

The 5G circuitry 730 may comprise a baseband system 732 and a radio frequency integrated circuit (RFIC) 733, operatively coupled together over a bi-directional connection 738. The baseband system 732 may comprise a processor 736, a memory 737 (including software (SW) 739), and a direct beam search/management module 710, which may communicate, directly or indirectly, with each other (e.g., via one or more buses 735).

The RFIC 733 may comprise an intermediate frequency (IF) sub-system 726 and a transceiver module 728 operatively coupled together over a bi-directional connection 741. The RFIC 733 may comprise one or more digital components and one or more analog components, such as, for example, phase shifters, switches, or other components configured for beamforming. In an exemplary embodiment, the transceiver module 728 may be configured to communicate over millimeter wave (mmW) frequencies. The transceiver module 728 may communicate bi-directionally, via the antenna(s) 712 and/or one or more wired or wireless links, with one or more networks, as described above. For example, the transceiver module 728 may communicate bi-directionally with base stations 105 and directly with UEs 115 (not shown). One or more of the analog components in the transceiver module 728 may be used when transitioning from one communication beam to another communication beam. In an exemplary embodiment, it may be desirable for a UE 115 that is coupled to a particular base station 105 to communicate directly with another UE 115 that is coupled to a different base station 105.

The transceiver module 728 may include a modem to modulate the packets and provide the modulated packets to the antenna(s) 712 for transmission, and to demodulate packets received from the antenna(s) 712. While the UE 115 may include a single antenna 712 the UE 115 may have multiple antennas capable of concurrently transmitting and/or receiving multiple wireless transmissions via carrier aggregation techniques, for example. The transceiver module 728 may be capable of concurrently communicating with one or more base stations 105 and/or UEs 115 via multiple component carriers. Some of the elements of the UE 115 of FIG. 7 are similar to, or represent examples of, some of the elements of the UE 550 of FIG. 5. For example, the antenna 712 may be similar to the antenna 552; the RF IC 733 may comprise components similar to the transmitter 554TX and the receiver 554RX; the memory 739 may be similar to the memory 560; and the processor 736 may be similar to the controller/processor 559.

The UE 115 may include a direct beam search/management module 710, which may perform the direct beam search and/or management functions described herein. In an exemplary embodiment, the direct beam search/management module 710 may be configured to cooperate with the processor 736 and the memory 737 to allow the UE 115 to communicate with a base station 105 and with another UE 115 to allow the subject UE 115 to perform a direct beam search with the other UE 115, which may be in proximity to the subject UE, and which may be coupled to a different base station than the base station to which the subject UE is coupled.

In an exemplary embodiment, the direct beam search/management module 710 may comprise direct beam search notification logic 752 configured to send a request to perform a direct beam search with another UE to a base station 105. In an exemplary embodiment, the direct beam search/management module 710 may also comprise a direct beam search scheduling logic 754, a direct beam search performance logic 756 and a direct beam search results processing logic 758.

In an exemplary embodiment, the direct beam search scheduling logic 754 may be configured to receive direct beam search scheduling information, such as information relating to communication beams and/or time and frequency communication resources, from a base station 105 to allow the UE 115 to have resources with which to perform a direct beam search with another UE.

In an exemplary embodiment, the direct beam search performance logic 756 may be configured to allow the UE 115 to perform a direct beam search with another UE 115.

In an exemplary embodiment, the direct beam search results processing logic 758 may be configured to allow the UE 115 to generate direct beam search results and to report the direct beam search results to a base station 105.

Although shown as a separate logic elements in FIG. 7, the instructions associated with the logic elements in the direct beam search/management module 710 may be partly or wholly stored in the memory 737 for execution by the processor 736. The logic elements in the direct beam search/management module 710 may be software, firmware, or a combination of software and firmware that can be configured and executed by the processor 736 to perform the functions described herein.

The memory 737 may include random access memory (RAM) and read-only memory (ROM). The memory 737 may store computer-readable, computer-executable software/firmware code 739 containing instructions that, when executed, cause the processor 736 to perform various functions described herein (e.g., perform synchronization operations, synchronize reference timing parameters, beam transition operations, etc.). Alternatively, the computer-readable, computer-executable software/firmware code 739 may not be directly executable by the processor 736 but cause a computer (e.g., when compiled and executed) to perform functions described herein. The processor 736 may include an intelligent hardware device, e.g., a central processing unit (CPU), a microcontroller, an application-specific integrated circuit (ASIC), etc.

Although the logic elements associated with the direct beam search/management module 710 are described in FIG. 7 in a conceptual manner as stored in or residing in the memory 737, persons skilled in the art understand that such logic elements arise through the operation of the processor 736 in accordance with conventional computing device principles. That is, software, firmware, or a combination of software and firmware contributes to programming or configuring the processing system to be characterized by such logic elements. Although the memory 737 is depicted in FIG. 7 as a single or unitary element for purposes of clarity, the memory 737 can be of any suitable type and can have any suitable structure, such as one or more modules, chips, etc. Likewise, although the processor 736 is depicted in FIG. 7 as a single or unitary element for purposes of clarity, the processor 736 can be of any suitable type and can have any suitable structure, such as one or more modules, chips, etc. For example, the processor 736 can comprise one or more microprocessors or microcontrollers. Some or all of the foregoing processing system elements can be provided in, for example, an application-specific integrated circuit (ASIC) or other integrated digital device. It should be understood that the combination of the memory 737 and the above-referenced modules or software, firmware, instructions, etc., underlying the logic elements, as stored in the memory 737 in non-transitory computer-readable form, defines a "computer program product" as that term is understood in the patent lexicon. In view of the descriptions herein, persons skilled in the art will readily be capable of providing suitable software or firmware or otherwise configuring the UE 115 to operate in the manner described. Also, although the effect of each of the above-referenced logic elements is described herein, it should be understood that the effect may result from contributions of two or more logic elements in concert, or from contributions of the logic elements and conventional switch logic elements or other software, hardware, or network elements that are not shown for purposes of clarity.

Figure 8:
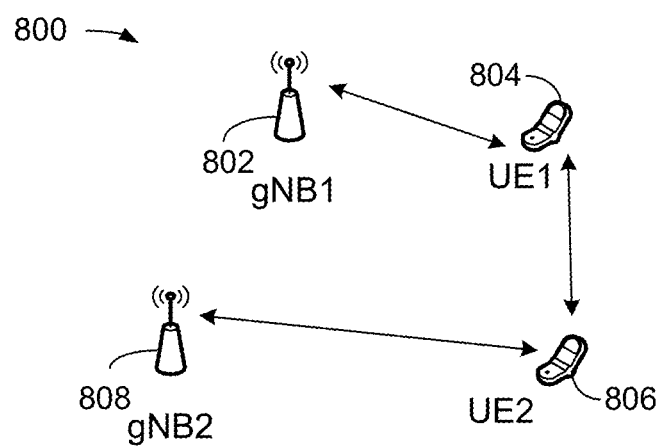
FIG. 8 is a diagram of a communications system in accordance with various aspects of the present disclosure.

FIG. 8 is a diagram of a communication system 800 having the capability of device-to-device (D2D) communication in accordance with various aspects of the present disclosure. The communications system 800 may be implemented by the network shown in FIG. 1, and, in an exemplary embodiment, includes a plurality of base stations 802 and 808 and a plurality of wireless devices 804 and 806. The device-to-device communications system 800 may overlap with a cellular communications system, such as for example, a wireless wide area network (WWAN).

In an exemplary embodiment, the wireless devices 804 and 806 may communicate with respective base stations 802 and 808, which in this exemplary embodiment, may be gNBs, with the communication links being mmW communication links. The wireless devices 804 and 806 may communicate directly in device-to-device (or peer-to-peer) communication using the DL/UL WWAN spectrum, may communicate with respective base stations 802 and 808, and may do both. For example, as shown in FIG. 8, the wireless devices 804 and 806 may be in communication with respective base stations 802 and 808, and may also be in device-to-device communication with each other.

In an alternative exemplary embodiment, the base station 802 and the base station 808 need not be capable of mmW communication. In such an example, the base station 802 and the base station 808 may perform the direct communication coordination described herein so long as the wireless devices 804 and 806 are capable of mmW communication with each other and are capable of communicating with their respective base stations 802 and 808.

In one configuration, one or more of the UEs 804 and 806 may be equipped or located on vehicles. In such a configuration, the D2D communications system 800 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE and 5G. However, one of ordinary skill in the art would understand that the exemplary methods and apparatuses are applicable more generally to a variety of other wireless device-to-device communication systems.

Figure 9:
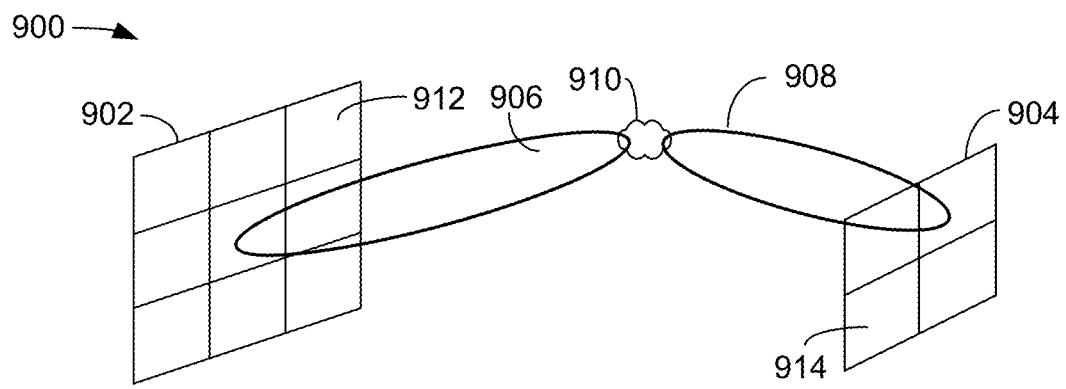
FIG. 9 is a diagram illustrating an example of beamforming in a low-frequency wireless communication system (e.g., LTE).

FIG. 9 is a diagram 900 illustrating an example of beamforming in a low-frequency wireless communication system (e.g., LTE). FIG. 9 includes antenna arrays 902 and 904. In an exemplary embodiment, the antenna array 902 may include a number of antenna elements (e.g., antenna element 912) arranged in a grid pattern (e.g., a planar array) and may be located in a base station, such as the base station 105 of FIG. 1 and FIG. 6 or the base station 510 of FIG. 5. In an exemplary embodiment, an antenna array may also be referred to as a panel. In an exemplary embodiment, the antenna array 904 may include a number of antenna elements (e.g., antenna element 914) arranged in a grid pattern and may be located in a UE, such as the UE 115 of FIG. 1 and FIG. 7 or the UE 550 of FIG. 5. As shown in FIG. 9, the antenna array 902 may transmit beam 906 and the antenna array 904 may receive via beam 908. In an exemplary embodiment, the beams 906 and 908 may reflect, scatter, and/or diffract via the cluster located at area 910.

Figure 10:
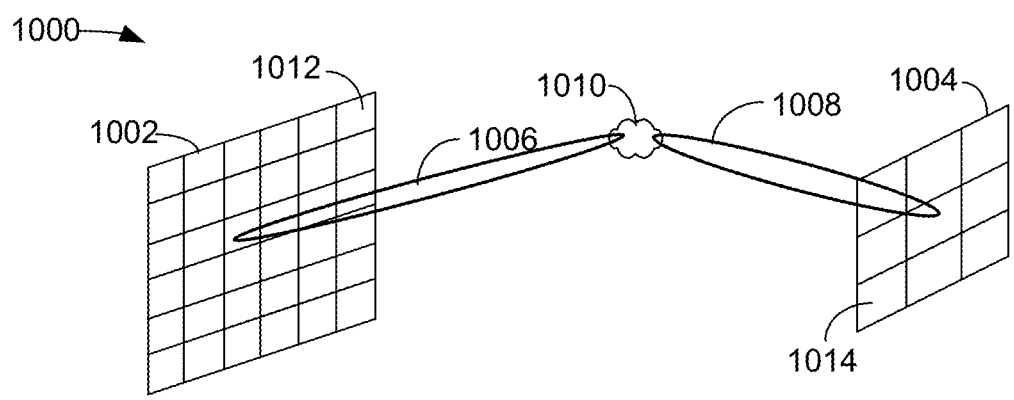
FIG. 10 is a diagram illustrating beamforming in a high-frequency wireless communication system (e.g., a mmW system).

FIG. 10 is a diagram 1000 illustrating beamforming in a high-frequency wireless communication system (e.g., a mmW system), which may be used to perform exemplary embodiments of the direct beam search described herein. FIG. 10 includes antenna arrays 1002 and 1004. In an exemplary embodiment, the antenna array 1002 may include a number of antenna elements (e.g., antenna element 1012) arranged in a grid pattern and may be located in an mmW-base station, such as the base station 105 of FIG. 1 and FIG. 6 or the base station 510 of FIG. 5. In an exemplary embodiment, the antenna array 1004 may include a number of antenna elements (e.g., antenna element 1014) arranged in a grid pattern and may be located in a UE, such as the UE 115 of FIG. 1 and FIG. 7 or the UE 550 of FIG. 5. As shown in FIG. 10, the antenna array 1002 may transmit beam 1006 and the antenna array 1004 may receive via beam 1008. In an exemplary embodiment, the beams 1006 and 1008 may reflect, scatter, and/or diffract via the cluster located at area 1010.

It should be noted that the antenna array 1002 in FIG. 10 includes a greater number of antenna elements than the antenna array 902 in FIG. 9, and that the antenna array 1004 in FIG. 10 includes a greater number of antenna elements than the antenna array 904 in FIG. 9. The greater number of antennas in the former scenario (relative to the latter) is because of the larger carrier frequency corresponding to smaller wavelengths that allows the deployment of a greater number of antennas within the same aperture/area. The greater number of antenna elements in antenna arrays 1002 and 1004 allow the beams 1006 and 1008 to have a narrow half-power beam width offering a high angular resolution relative to the beams 906 and 908 from antenna arrays 902 and 904. Therefore, the lower number of antenna elements in antenna arrays 902 and 904 in the low-frequency wireless communication system may result in a wider angular resolution, while providing a better link margin than in the mmW system.

In a stand-alone mmW wireless communication system, the high link losses (due to penetration, diffraction, reflection, etc.) may prevent discovery of the angular information of multipath. In contrast, a low-frequency wireless communication system may provide a link having a higher quality (e.g., a link having higher SNR) than a link in a stand-alone mmW wireless communication system. This higher SNR of the low-frequency wireless communication system and the coexistence of the low-frequency and the stand-alone mmW wireless communication systems may be leveraged to determine the angular information and/or relative path gains for the beamforming scheme. Since the angular information and/or relative path gains for the beamforming scheme is only determined by the relative geometries of the transmitter, the receiver, and the scatterers, such angular information and/or relative path gains are generally invariant in both stand-alone mmW and low-frequency wireless communication systems. While there are scenarios where the ranking (of dominance) of paths could change with changing carrier frequency (e.g., due to differential scattering and/or absorption losses at different frequencies), such ranking may not change in a majority of cases.

Figure 11:
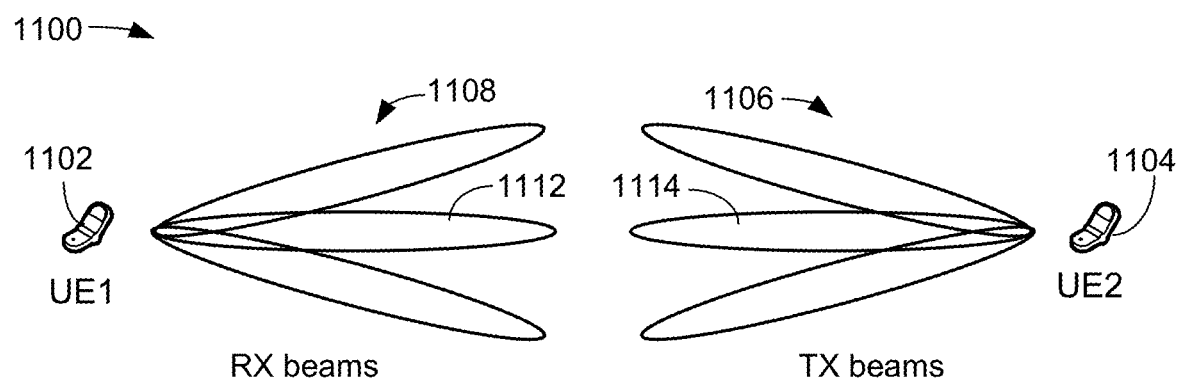
FIG. 11 is a diagram illustrating a communication system in accordance with various aspects of the present disclosure.

FIG. 11 is a diagram illustrating a communication system in accordance with various aspects of the present disclosure. A communication system 1100 may comprise a first UE 1102 and a second UE 1104 performing a direct beam search. In an exemplary embodiment, the first UE 1102 may be referred to as UE1 and the second UE 1104 may be referred to as UE2. In an exemplary embodiment, the second UE 1104 may initiate a plurality of transmit (TX) beams 1106 and the first UE 1102 may initiate a plurality of receive (RX) beams 1108. In an exemplary embodiment, the first UE 1102 and the second UE 1104 perform a direct beam search to discover one or more communication beam pairs (a transmit beam and a receive beam) over which to communicate directly. In an exemplary embodiment, the second UE 1104 may transmit beam search signals on one or more of its TX beams 1106 and the first UE 1102 may attempt to receive the beam search signal on one or more of its RX beams 1108. In an exemplary embodiment, once the first UE 1102 receives the beam search signal on one of its RX beams 1108, for example, RX beam 1112, it will know which TX beam of TX beams 1106, for example, TX beam 1114, that the search signal was sent on. In this exemplary embodiment, the first UE 1102 would then send a beam search report having the beam search results, including one or more of the information identifying the TX beam 1114 of the second UE 1104, and the RX beam 1112 of the first UE 1102, to the base station 105 (not shown) to which the first UE 1102 is coupled. In an exemplary embodiment a transmit beam, such as the TX beam 1114, and a receive beam, such as the RX beam 1112, may be referred to as a beam pair, over which the first UE 1102 and the second UE 1104 may directly communicate. One or more of such beam pairs may be identified by the first UE 1102 during the direct beam search process and forwarded to the base station 105 to which the first UE 1102 is coupled. The beam pair selected for direct UE-to-UE communication may change based on channel conditions, interference, etc. The choice of which UE initiates the TX beams and which UE initiates the RX beams is arbitrary, and can be determined by the base stations 105 to which the first UE 1102 and the second UE 1104 are coupled. In an alternative exemplary embodiment, any of the first UE 1102 and/or the second UE 1104 may be the transmitting UE and/or the receiving UE for purposes of performing the beam search.

FIG. 12 is a call flow diagram 1200 in accordance with an exemplary embodiment of the disclosure. In this exemplary embodiment, the call flow diagram 1200 shows a first UE (UE1) 1202, a second UE (UE2) 1204, a first base station (gNB1) 1206 and a second base station (gNB2) 1208. In an exemplary embodiment, the first UE (UE1) 1202 may be referred to as an "initiating" UE, and the second UE (UE2) 1204 may be referred to as a "target" UE. In an exemplary embodiment, the first base station (gNB1) 1206 may be the serving base station for the first (initiating) UE (UE1) 1202 and the second base station (gNB2) 1208 may be the serving base station for the second (target) UE (UE2) 1204. In another exemplary embodiment, the first base station (gNB1) 1206 and the second base station (gNB2) 1208 can be the same base station (gNB). In such an example where the first base station (gNB1) 1206 and the second base station (gNB2) 1208 are the same, the gNB determines the communication beams, resources, etc., used for direct beam search. Further, as used herein, the term "base station" refers to any device that schedules transmissions and/or resources, including communication beams, time and frequency resources, etc., for any UE that the base station serves.

In an exemplary embodiment, at call 1212, the first UE 1202 transmits a request to the first gNB 1206 to establish a direct communication channel with the second UE 1204. In an exemplary embodiment, the request in the call 1212 may be made using a MAC control element (MAC-CE) based communication. In an exemplary embodiment, the request in the call 1212 may comprise one or more of the capability for direct link communication of the first UE 1202, the number of potential communication beams available to the first UE 1202 for direct communication, communication beam properties, the number of antennas, or the number of antenna arrays or panels available to the first UE 1202, the Tx power of the first UE 1202, and other transmission capabilities of the first UE 1202, the identification (ID) of the second UE 1204, and other information identifying the second gNB 1208 (referred to as the serving gNB for the second UE 1204) that is in communication with the second UE 1204, if such identifying information is available, or any combination thereof.

For example, through the use of discovery signals transmitted by a UE, the first UE 1202 may "discover" the second UE 1204, and through this discovery process, may acquire the ID of the second UE 1204, and in certain circumstances, may also acquire the ID of the second gNB 1208. If the first UE 1202 cannot acquire the ID of the second gNB 1208 through the discovery process with the first UE 1202, then the first UE 1202 can query the first gNB 1206 to search for a gNB having the second UE 1204 coupled to it. In an exemplary embodiment, the first gNB 1206 can query the network for the second gNB 1208. The core network 130 (FIG. 1) can provide information pertaining to which UE is attached to which gNB and which gNB serves which UE. The core network 130 can then respond to the first gNB 1206 with the ID of the second gNB 1208. In an exemplary embodiment, the number of available communication beams can be one communication beam.

In call 1214, the first gNB 1206 sends a communication to the second gNB 1208 to initiate direct beam search between the first UE 1202 and the second UE 1204. As an example, the communication in the call 1214 may occur over backhaul link 134 using, for example, the X1 communication protocol. The information in call 1214 may include one or more of the ID of the second UE 1204, and the capability for direct link communication of the first UE 1202. The information in call 1214 may also be used to coordinate scheduling of direct beam search and/or beam management between the first UE 1202 and the second UE 1204. If the initial request made by the first UE 1202 in call 1212 did not include the ID of the second gNB 1208, then it may be possible for the first gNB 1206 to learn the ID of the second gNB 1208 through the core network 130 as described above, or by using one or more backhaul connections, such as backhaul link 134.

In calls 1216 and 1218, the second gNB 1208 and the second UE 1204 exchange information relating to the request made by the first UE 1202 for direct communication with the second UE 1204. In an exemplary embodiment, the communication in the calls 1216 and 1218 may be made using a MAC control element (MAC-CE) based communication. In the calls 1216 and 1218, the second gNB 1208 and the second UE 1204 exchange information relevant to direct beam search, such as the request from the first UE 1202 to establish a direct communication link with the second UE 1204, and the capability of the first UE 1202 to perform direct link communication. The information in the call 1218 sent by the second UE 1204 to the second gNB 1208 may include the capability for direct link communication by the second UE 1204, the number of communication beams available to the second UE 1204 for direct communication, communication beam properties, the number of antennas, or the number of antenna arrays or panels available to the second UE 1204, and other transmission capabilities of the second UE 1204, and other information, or any combination thereof.

In calls 1222 and 1224, if the first gNB 1206 and the second gNB 1208 agree to the request for direct UE communication, the first gNB 1206 and the second gNB 1208 exchange messages related to scheduling communication resources to allow the first UE 1202 and the second UE 1204 to perform direct UE-to-UE beam search. For example, the messages in calls 1222 and 1224 may comprise scheduling information, such as, for example, the time and frequency resources common to both the first UE 1202 and the second UE 1204 that may be available for direct beam search between the first UE 1202 and the second UE 1204, and the frequency (e.g., the periodicity), of how often the direct beam search is to be performed. The information exchanged between the first gNB 1206 and the second gNB 1208 may also include which of the communication beams available to the first UE 1202 and to the second UE 1204 to make available to the first UE 1202 and the second UE 1204 for direct beam search. The messages in calls 1222 and 1224 may also comprise reference signal (RS) information, waveform information, the available communication beams, communication beam ID, beam width, etc. The messages in calls 1222 and 1224 may also comprise the ID of the transmitting UE (for example, the UE 1104 of FIG. 11 that would transmit the beam search signal on one or more TX beams 1106), and the ID of the receiving UE (for example, the UE 1102 of FIG. 11 that would attempt to receive the beam search signal on one or more RX beams 1108). The choice of transmitting UE and receiving UE is arbitrary. In an exemplary embodiment to be described below, in this example, the second UE 1204 may be the transmitting UE and the first UE 1202 may be the receiving UE for purposes of direct communication beam search. In certain circumstances, the second gNB 1208 may decline the first UEs request for direct communication with the second UE if, for example, the direct UE-to-UE communication link between the first UE 1202 and the second UE 1204 may cause interference to communications between the second gNB 1208 and any UEs served by the second gNB 1208.

In call 1226 the first gNB 1206 communicates with the first UE 1202 to schedule communication beams and/or time and frequency resources for the first UE 1202 to use for direct beam search. In an exemplary embodiment, the communication in the call 1226 may be made using a MAC control element (MAC-CE) based communication.

In call 1228 the second gNB 1208 communicates with the second UE 1204 to schedule time and frequency resources for the second UE 1204 to use for direct beam search. In an exemplary embodiment, the communication in the call 1228 may be made using a MAC control element (MAC-CE) based communication. In an exemplary embodiment, the information in the calls 1226 and 1228 may comprise information identifying one or more communication beams that may be available to the first UE 1202 and the second UE 1204 for performing direct beam search, scheduling information, such as, for example, the time and frequency resources common to both the first UE 1202 and the second UE 1204 that may be available for direct beam search, and the frequency (e.g., the periodicity) of performing the direct beam search process. The frequency of performing the direct beam search process may be influenced by, for example, communication channel quality, channel interference, whether the first UE 1202 and/or the second UE 1204 are moving, changing channel conditions (which can, for example, be due to mobility or movement of first UE 1202 and/or the second UE 1204), or other channel parameters. In an exemplary embodiment, the direct beam search process may be performed once, and then a determination based on channel quality, interference, changing channel conditions, or other channel parameters, may be dynamically made by a UE (e.g., either first UE 1202 and/or the second UE 1204) to determine how often to subsequently perform the direct beam search process. Alternatively, the frequency, or period, of performing the direct beam search process may be scheduled in advance and performed periodically based on an advanced schedule. The messages in calls 1222 and 1224 may also comprise reference signal (RS) information, waveform information, the available TX and RX communication beams, communication beam ID, beam width, etc. The messages in calls 1222 and 1224 may also comprise the ID of the transmitting UE, and the ID of the receiving UE, as described herein. In an exemplary embodiment to be described below, in this example, the second UE 1204 will be the transmitting UE and the first UE 1202 will be the receiving UE for purposes of direct communication beam search.

In calls 1232 and 1234, the first UE 1202 and the second UE 1204 perform direct beam search using the communication beams, and/or the time and frequency resources that were previously scheduled in calls 1226 and 1228. In an exemplary embodiment, the communication in the calls 1232 and 1234 may be made using RRC communications, for example. In an exemplary embodiment, the first UE 1202 generates a direct beam search report that is based on the direct beam search. The beam search report includes the direct beam search results.

In an exemplary embodiment, the frequency (e.g., periodicity) with which the direct beam search process may be performed may be variable based on a number of factors, such as, for example, the quality of a particular communication beam over which the first UE 1202 and the second UE 1204 will use for direct communication, whether the first UE 1202 and/or the second UE 1204 are moving, channel interference, changing channel conditions, and other factors.

In call 1236, the first UE 1202 sends a direct beam search report, having the direct beam search results, to the first gNB 1206. In an exemplary embodiment, the information in the call 1236 may comprise the IDs of the one or more transmit and receive communication beams that the second UE 1204 and the first UE 1202 can use to establish a direct communication link between them. The beams related to the second UE 1204 may comprise one or more of the TX beams 1106 (FIG. 11) used by the second UE 1204 and one or more of the RX beams 1108 (FIG. 11) used by the first UE 1202 during direct beam search. These communication beams are identified by the first UE 1202 during direct beam search and the beam IDs are forwarded to the first gNB 1206 in call 1236. The information in call 1236 may also comprise the properties of the communication beams that can be used for direct link communication. These properties may include, for example, for example, RSRP (reference signal received power), SINR (signal to interference and noise ratio), SNR (signal to noise ratio), interference, delay spread, and other beam properties, or any combination thereof, etc.

In calls 1238 and 1239, the first gNB 1206 relays the direct beam search report, having the direct beam search results provided by the first UE 1202, to the second gNB 1208. The first gNB 1206 and the second gNB 1208 share relevant information in the beam search report and jointly determine the communication beams to be used by the first UE 1202 and the second UE 1204 for direct link communication. In an exemplary embodiment, for each beam that the first UE 1202 can use for direct link communication, there is a corresponding beam that the second UE 1204 should use for direct link communication, the beams forming a beam pair, such as the TX beam 1114 and the RX beam 1112 (FIG. 11).

In call 1240, the first gNB 1206 informs the first UE 1202 of which communication beam to use for direct link communication with the second UE 1204.

In call 1242, the second gNB 1208 relays the direct beam search report, having the direct beam search results provided by the first UE 1202 to the second UE 1204 and informs the second UE 1204 of which communication beam to use for direct communication with the first UE 1202.

In an exemplary embodiment, the communication beam pair that will be used for direct link communication between the first UE 1202 and the second UE 1204 may be the beam pair recommended by the first UE 1202 after performing the direct beam search in calls 1232 and 1234. In an alternative exemplary embodiment, the first gNB 1206 and the second gNB 1208 may receive the beam search results from the first UE 1202 (call 1236 and call 1238), but then based on a number of factors, may select a beam pair other than a beam pair recommended by the first UE 1202. In an exemplary embodiment, the call 1240 may be optional because if the first gNB 1206 selects a beam pair that is recommended by the first UE 1202 in the call 1236, then the first gNB 1206 need not inform the first UE 1202 of the beam pair. However, if the first gNB 1206 and the second gNB 1208 select a different beam pair than the one recommended by the first UE 1202, then the call 1240 can be used to inform the first UE 1202 of the selected beam pair.

In calls 1244 and 1246, the first UE 1202 and the second UE 1204 communicate directly using the resources scheduled in calls 1240 and 1242 and communicate directly on the identified communication beams. In an exemplary embodiment, the first UE 1202 and the second UE 1204 communicate directly using the resources that are scheduled by the first gNB 1206 and the second gNB 1208. In an exemplary embodiment, the first gNB 1206 and the second gNB 1208 can manage the frequency, or periodicity, with which the direct beam search is performed by the first UE 1202 and the second UE 1204.

Figure 13:
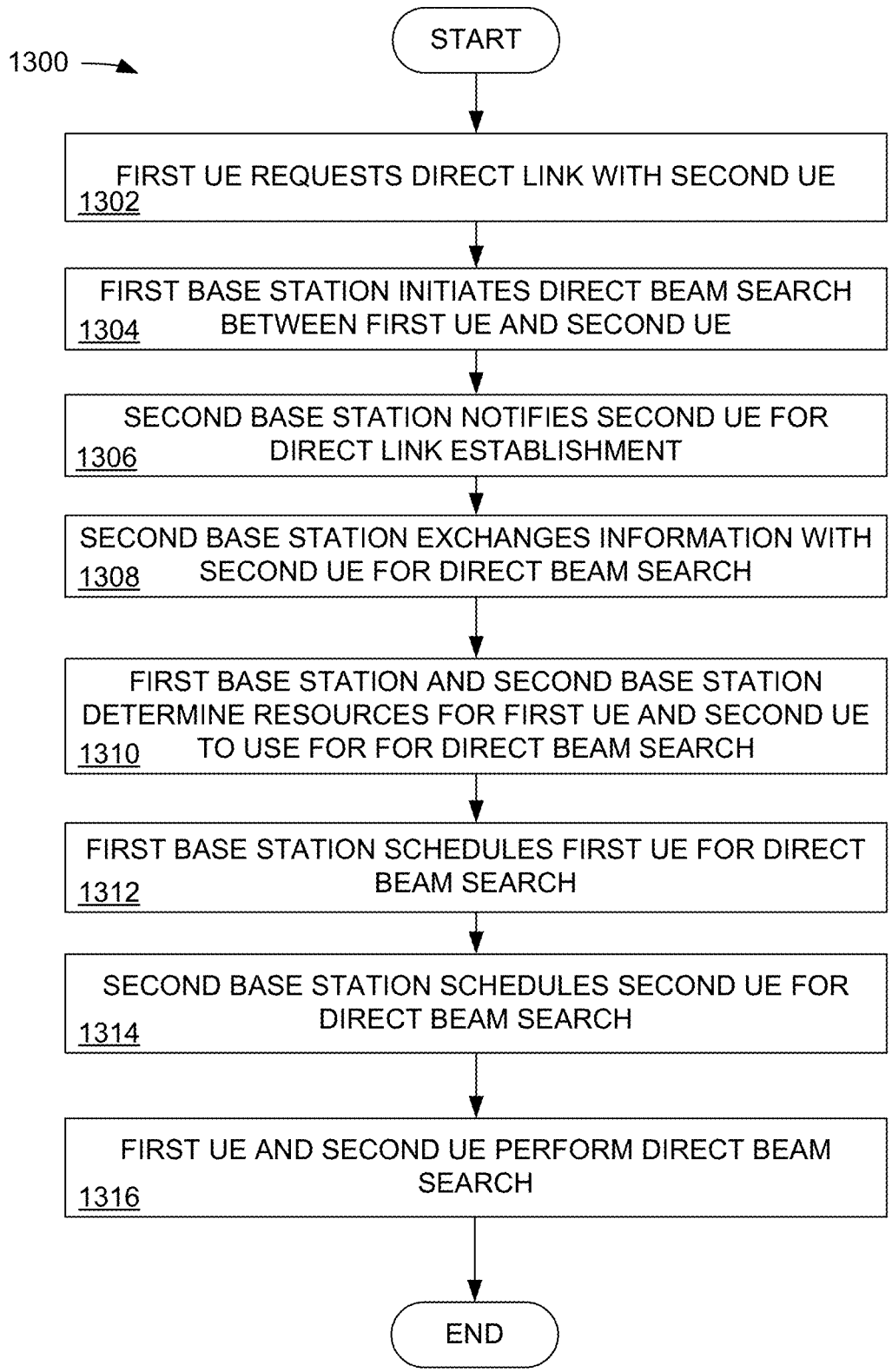
FIG. 13 is a flow chart illustrating an example of a method for communication, in accordance with various aspects of the present disclosure.

FIG. 13 is a flow chart illustrating an example of a method for communication, in accordance with various aspects of the present disclosure. The blocks in the method 1300 can be performed in or out of the order shown, and in some embodiments, can be performed at least in part in parallel.

In block 1302, a first UE requests a direct communication link with a second UE. The request may be forwarded to a first base station 1206 (gNB1) with which the first UE 1202 is in communication. In one example, the first base station 1206 (gNB1) is a serving base station of the first UE 1202.

In block 1304, the first base station 1206 (gNB1) initiates direct beam search between the first UE 1202 and the second UE 1204. In an exemplary embodiment, the first base station 1206 (gNB1) sends a communication to a second base station 1208 (gNB2) to initiate direct beam search between the first UE 1202 and the second UE 1204. In one example, the second base station 1208 (gNB2) is a serving base station of the second UE 1204.

In block 1306, the second base station 1208 (gNB2) notifies the second UE 1204 that a request for direct communication with the first UE 1202 has been made.

In block 1308, the second base station 1208 (gNB2) exchanges information with the second UE 1204 to establish a direct beam search with the first UE 1202.

In block 1310, the first base station 1206 (gNB1) and the second base station 1208 (gNB2) determine the resources that will be scheduled to allow the first UE 1202 and the second UE 1204 to perform a direct beam search. For example, if the first base station 1206 (gNB1) and the second base station 1208 (gNB2) agree to the request for direct UE communication, the first base station 1206 (gNB1) and the second base station 1208 (gNB2) exchange messages related to scheduling communication resources, such as time and frequency resources, to allow the first UE 1202 and the second UE 1204 to perform direct beam search.

In block 1312, the first base station 1206 (gNB1) schedules time and frequency resources for the first UE 1202 to use for direct beam search.

In block 1314, the second base station 1208 (gNB2) schedules time and frequency resources for the second UE 1204 to use for direct beam search.

In block 1316, the first UE 1202 and the second UE 1204 perform direct beam search using the time and frequency resources that were previously scheduled in blocks 1312 and 1314. The result of the direct beam search provides information relating to communication beams that may be available to the first UE 1202 and the second UE 1204 for direct communication.

Figure 14:
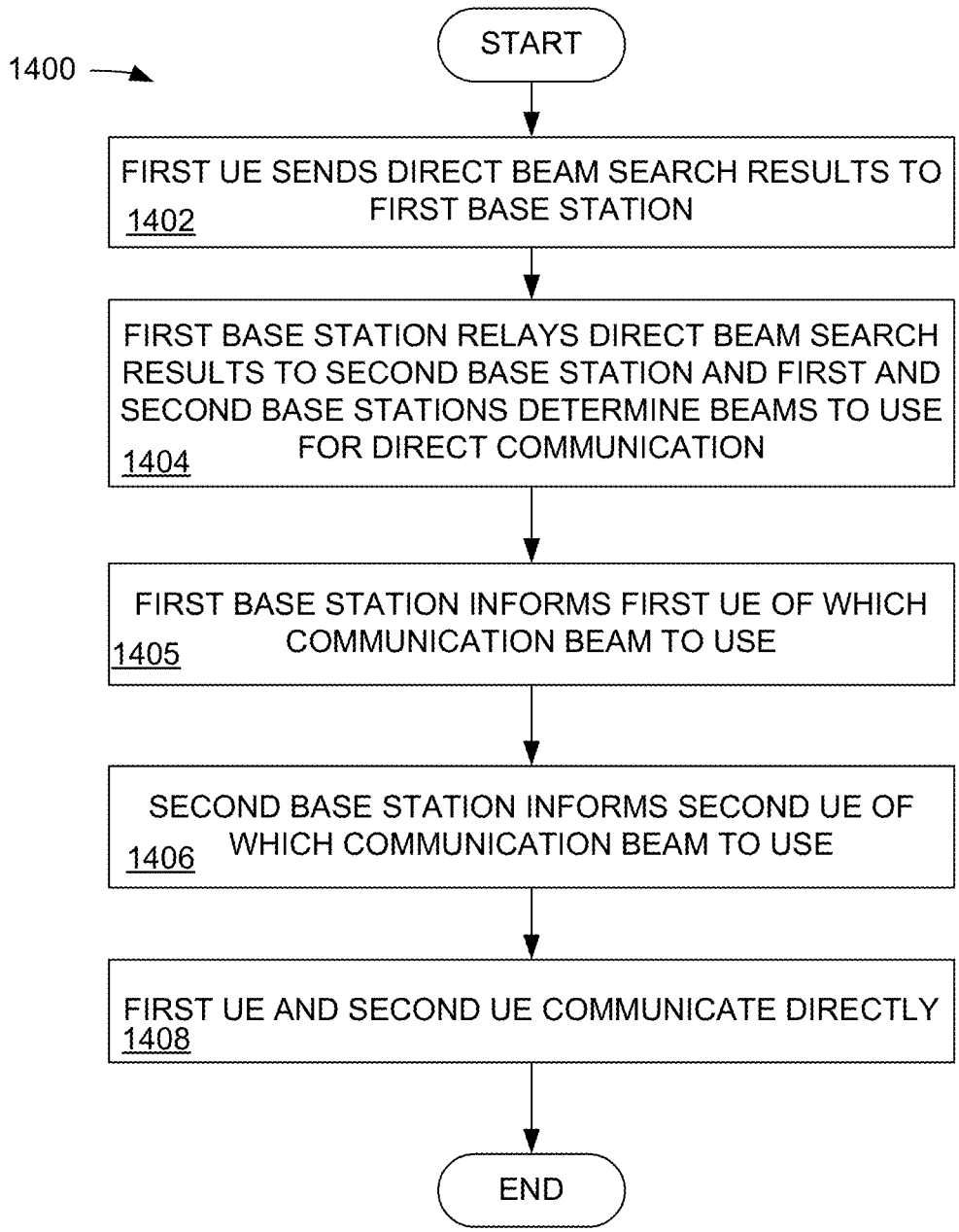
FIG. 14 is a flow chart illustrating an example of a method for communication, in accordance with various aspects of the present disclosure.

FIG. 14 is a flow chart illustrating an example of a method for communication, in accordance with various aspects of the present disclosure. The blocks in the method 1400 can be performed in or out of the order shown, and in some embodiments, can be performed at least in part in parallel.

In block 1402, the first UE 1202 sends a beam search report having the results of the direct beam search to the first base station 1206 (gNB1).

In block 1404, the first base station 1206 (gNB1) relays the results of the direct beam search to the second base station 1208 (gNB2), and the first base station 1206 (gNB1) and the second base station 1208 (gNB2) determine which communication beams that the first UE 1202 and the second UE 1204 will use for direct communication.

In block 1405, the first base station 1206 (gNB1) informs the first UE 1202 of the communication beam to use for direct communication.

In block 1406, the second base station 1208 (gNB2) informs the second UE 1204 of the communication beam to use for direct communication.

In block 1408, the first UE 1202 and the second UE 1204 communicate directly over the selected communication beam.

Figure 15:
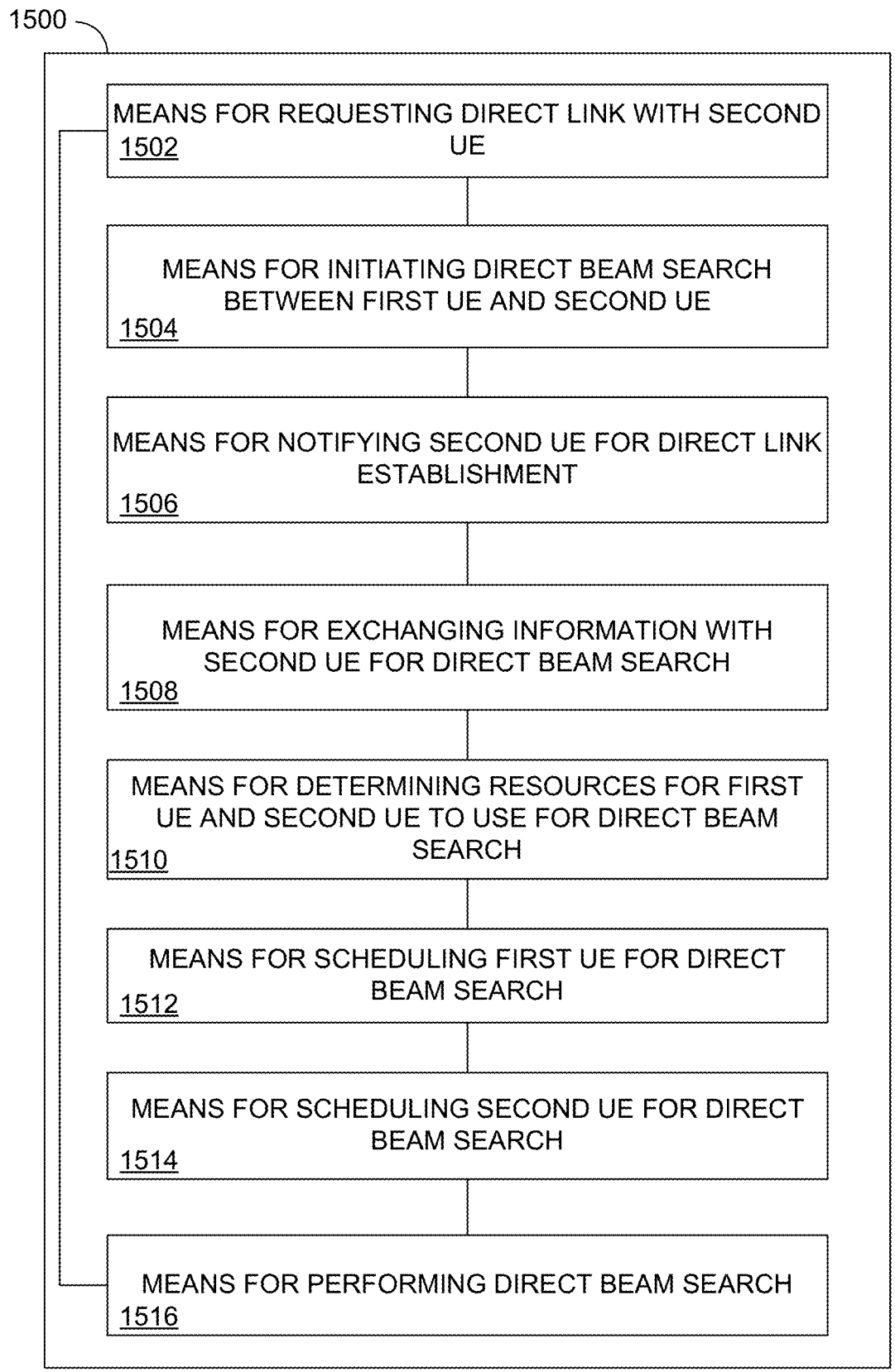
FIG. 15 is a functional block diagram of an apparatus for a communication system in accordance with various aspects of the present disclosure.

FIG. 15 is a functional block diagram of an apparatus 1500 for a communication system in accordance with various aspects of the present disclosure. The apparatus 1500 comprises means 1502 for requesting a direct communication link with a second UE. In certain embodiments, the means 1502 for requesting a direct communication link with a second UE can be configured to perform one or more of the functions described in operation block 1302 of method 1300 (FIG. 13). In an exemplary embodiment, the means 1502 for requesting a direct communication link with a second UE may comprise a first UE 1202 sending the request to a first base station 1206 (gNB1) with which the first UE 1202 is in communication. In an exemplary embodiment, the antenna 712, RFIC 733, processor 736, memory 739, and direct beam search notification logic 752 in a UE 115 (FIG. 7) may cooperate to send the request; and the antenna 612, RFIC 633, processor 636, memory 637 and direct beam search notification logic 652 in a base station 105 (FIG. 6) may cooperate to receive and process the request.

The apparatus 1500 further comprises means 1504 for initiating a direct beam search between a first UE and a second UE. In certain embodiments, the means 1504 for initiating a direct beam search between a first UE and a second UE can be configured to perform one or more of the functions described in operation block 1304 of method 1300 (FIG. 13). In an exemplary embodiment, the means 1504 for initiating a direct beam search between a first UE and a second UE may comprise the first base station 1206 (gNB1) informing the second base station 1208 (gNB2) of the desire of the first UE 1202 to communicate directly with the second UE 1204. In an exemplary embodiment, the antenna 612, RFIC 633, processor 636, memory 637 and direct beam search notification logic 652 in a base station 105 (FIG. 6) may cooperate to initiate the request; and the antenna 612, RFIC 633, processor 636, memory 637 and direct beam search notification logic 652 in another base station 105 (FIG. 6) may cooperate to receive and process the request.

The apparatus 1500 further comprises means 1506 for notifying a second UE for direct link establishment. In certain embodiments, the means 1506 for notifying a second UE for direct link establishment can be configured to perform one or more of the functions described in operation block 1306 of method 1300 (FIG. 13). In an exemplary embodiment, the means 1506 for notifying a second UE for direct link establishment may comprise the second base station 1208 (gNB2) communicating with the second UE 1204 to notify the second UE 1204 of the desire of the first UE 1202 to communicate directly. In an exemplary embodiment, the antenna 612, RFIC 633, processor 636, memory 637 and direct beam search notification logic 652 in a base station 105 (FIG. 6) may cooperate to notify the second UE; and the antenna 712, RFIC 733, processor 736, memory 737 and direct beam search notification logic 752 in the second UE 115 may cooperate to receive and process the request.

The apparatus 1500 further comprises means 1508 for exchanging information with a second UE for direct beam search. In certain embodiments, the means 1508 for exchanging information with a second UE for direct beam search can be configured to perform one or more of the functions described in operation block 1308 of method 1300 (FIG. 13). In an exemplary embodiment, the means 1508 for exchanging information with a second UE for direct beam search may comprise the second base station 1208 (gNB2) communicating with the second UE 1204 to exchange relevant information regarding the second UE 1204 establishing a direct communication link with the first UE 1202 to perform a direct beam search. In an exemplary embodiment, the antenna 612, RFIC 633, processor 636, memory 637 and direct beam search notification logic 652 in a base station 105 (FIG. 6) may cooperate to exchange information with the second UE; and the antenna 712, RFIC 733, processor 736, memory 737 and direct beam search notification logic 752 in the second UE 115 may cooperate to exchange information with the second base station 105.

The apparatus 1500 further comprises means 1510 for determining resources to schedule a first UE and a second UE to use for direct communication. In certain embodiments, the means 1510 for determining resources to schedule a first UE and a second UE to use for direct communication can be configured to perform one or more of the functions described in operation block 1310 of method 1300 (FIG. 13). In an exemplary embodiment, the means 1510 for determining resources to schedule a first UE and a second UE to use for direct communication may comprise the first base station 1206 (gNB1) and the second base station 1208 (gNB2) exchanging information relative to determining the communication beams and/or the time and frequency resources to schedule to allow the first UE 1202 and the second UE 1204 to perform direct beam search. In an exemplary embodiment, the antenna 612, RFIC 633, processor 636, memory 637 and direct beam search scheduling logic 654 in a first base station 105 (FIG. 6) may cooperate to schedule resources with a second base station 105; and the antenna 612, RFIC 633, processor 636, memory 637 and direct beam search scheduling logic 654 in a second base station 105 (FIG. 6) may cooperate to schedule resources with the a first base station 105.

The apparatus 1500 further comprises means 1512 for scheduling a first UE for direct beam search. In certain embodiments, the means 1512 for scheduling a first UE for direct beam search can be configured to perform one or more of the functions described in operation block 1312 of method 1300 (FIG. 13). In an exemplary embodiment, the means 1512 for scheduling a first UE for direct beam search may comprise the first base station 1206 (gNB1) transmitting scheduling information including communication beams and/or time and frequency resources to a first UE 1202. In an exemplary embodiment, the antenna 612, RFIC 633, processor 636, memory 637 and direct beam search scheduling logic 654 in a first base station 105 (FIG. 6) may cooperate to schedule resources for a first UE 115; and the antenna 712, RFIC 733, processor 736, memory 737 and direct beam search scheduling logic 754 in the first UE 115 (FIG. 7) may cooperate to schedule resources.

The apparatus 1500 further comprises means 1514 for scheduling a second UE for direct beam search. In certain embodiments, the means 1514 for scheduling a second UE for direct beam search can be configured to perform one or more of the functions described in operation block 1314 of method 1300 (FIG. 13). In an exemplary embodiment, the means 1514 for scheduling a second UE for direct beam search may comprise the second base station 1208 (gNB2) transmitting scheduling information including communication beams and/or time and frequency resources to a second UE 1204. In an exemplary embodiment, the antenna 612, RFIC 633, processor 636, memory 637 and direct beam search scheduling logic 654 in a second base station 105 (FIG. 6) may cooperate to schedule resources for a second UE 115; and the antenna 712, RFIC 733, processor 736, memory 737 and direct beam search scheduling logic 754 in the second UE 115 may cooperate to schedule resources.

The apparatus 1500 further comprises means 1516 for performing direct beam search. In certain embodiments, the means 1516 for performing direct beam search can be configured to perform one or more of the functions described in operation block 1316 of method 1300 (FIG. 13). In an exemplary embodiment, the means 1516 for performing direct beam search may comprise the first UE 1202 and the second UE 1204 performing direct beam search using the communication beams and/or time and frequency resources that were previously scheduled by the first base station 1206 (gNB1) and the second base station 1208 (gNB2). In an exemplary embodiment, the antenna 712, RFIC 733, processor 736, memory 737 and direct beam search performance logic 756 in a first UE 115 (FIG. 7) may cooperate to perform a direct beam search with a second UE 115; and the antenna 712, RFIC 733, processor 736, memory 737 and direct beam search performance logic 756 in the second UE 115 may cooperate to perform a direct beam search with a first UE 115.

Figure 16:
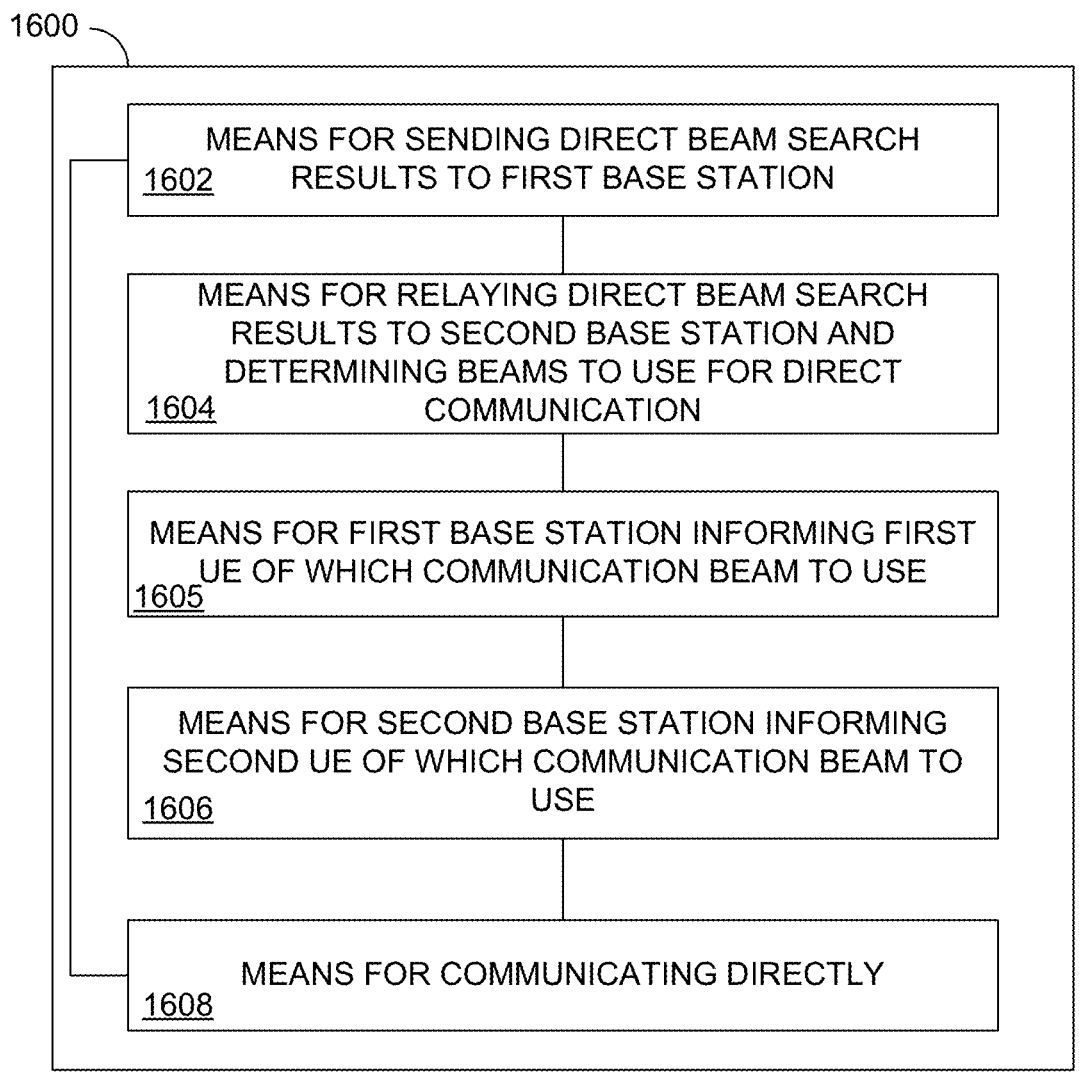
FIG. 16 is a functional block diagram of an apparatus for a communication system in accordance with various aspects of the present disclosure.

FIG. 16 is a functional block diagram of an apparatus 1600 for a communication system in accordance with various aspects of the present disclosure. The apparatus 1600 comprises means 1602 for sending direct beam search results to a base station. In certain embodiments, the means 1602 for sending direct beam search results to a base station can be configured to perform one or more of the functions described in operation block 1402 of method 1400 (FIG. 14). In an exemplary embodiment, the means 1602 for sending direct beam search results to a base station may comprise the first UE 1202 sending the results of the direct beam search to the first base station 1206 (gNB1). In an exemplary embodiment, the antenna 712, the RFIC 733, the processor 736, memory 737 and direct beam search results processing logic 758 in a first UE 115 (FIG. 7) may cooperate to send a beam search report having the direct beam search results to a base station 105; and the antenna 612, RFIC 633, processor 636, memory 637 and direct beam search results relay logic 656 in the base station 105 may cooperate to receive and process the beam search results.

The apparatus 1600 further comprises means 1604 for relaying the direct beam search results to a second base station and determining which communication beams to use for direct communication. In certain embodiments, the means 1604 for relaying the direct beam search results to a second base station and determining which communication beams to use for direct communication can be configured to perform one or more of the functions described in operation block 1404 of method 1400 (FIG. 14). In an exemplary embodiment, the means 1604 for relaying the direct beam search results to a second base station and determining which communication beams to use for direct communication may comprise the first base station 1206 (gNB1) relaying the direct beam search results to the second base station 1208 (gNB2) and determining with the second base station 1208 (gNB2) which communication beam pair that the first UE 1202 and the second UE 1204 will use for direct communication. In an exemplary embodiment, the antenna 612, RFIC 633, processor 636, memory 637 and direct beam search results relay and processing logic 656 in the base station 105 (FIG. 6) may cooperate to send the beam search results to a second base station 105; and the antenna 612, RFIC 633, processor 636, memory 637 and direct beam search results relay and processing logic 656 in a second base station 105 may cooperate to receive and process the beam search results.

The apparatus 1600 further comprises means 1605 for informing the first UE 1202 of which communication beam to use for direct communication. In certain embodiments, the means 1605 for informing the first UE 1202 of which communication beam to use for direct communication can be configured to perform one or more of the functions described in operation block 1405 of method 1400 (FIG. 14). In an exemplary embodiment, the means 1605 for informing the first UE 1202 of which communication beam to use for direct communication may comprise the first base station 1206 (gNB1) informing the first UE 1202 of which communication beam to use for direct communication. In an exemplary embodiment, the antenna 612, RFIC 633, processor 636, memory 637 and direct beam search results relay and processing logic 656 in a base station 105 (FIG. 6) may cooperate to inform a UE 115 of which communication beam to use; and the antenna 712, RFIC 733, processor 736, memory 737 and direct beam search results processing logic 758 in the UE 115 may cooperate to receive and process the beam search results.

The apparatus 1600 further comprises means 1606 for informing the second UE 1204 of which communication beam to use for direct communication. In certain embodiments, the means 1606 for informing the second UE 1204 of which communication beam to use for direct communication can be configured to perform one or more of the functions described in operation block 1406 of method 1400 (FIG. 14). In an exemplary embodiment, the means 1606 for informing the second UE 1204 of which communication beam to use for direct communication may comprise the second base station 1208 (gNB2) relaying the results of the direct beam search to the second UE 1204 to inform the second UE 1204 of which communication beam to use for direct communication. In an exemplary embodiment, the antenna 612, RFIC 633, processor 636, memory 637 and direct beam search results relay and processing logic 656 in a base station 105 (FIG. 6) may cooperate to send the beam search results to a UE 115; and the antenna 712, RFIC 733, processor 736, memory 737 and direct beam search results processing logic 758 in a the UE 115 may cooperate to receive and process the beam search results.

The apparatus 1600 further comprises means 1608 for communicating directly. In certain embodiments, the means 1608 for communicating directly can be configured to perform one or more of the functions described in operation block 1408 of method 1400 (FIG. 14). In an exemplary embodiment, the means 1608 for communicating directly may comprise the first UE 1202 and the second UE 1204 communicate directly over the selected communication beams. In an exemplary embodiment, a first UE and a second UE may use the antenna 712, the RFIC 733, and the baseband subsystem 732 to communicate directly with each other.

FIG. 17 is a flow chart illustrating an example of a method for communication, in accordance with various aspects of the present disclosure. The blocks in the method 1700 can be performed in or out of the order shown, and in some embodiments, can be performed at least in part in parallel.

In block 1702, a first UE, or initiating UE, requests a direct communication link with a second UE, or a target UE by transmitting a request to establish a direct link communication with the second UE, or target UE. With reference to FIG. 12, in one example, the request may correspond to call 1212 and may be transmitted to a first base station 1206 (gNB1) with which the first UE 1202 is in communication. In one example, the first, or initiating, base station 1206 (gNB1) is a serving base station of the first UE 1202.

In block 1704, the first, or initiating, UE 1202 receives information identifying resources to use for direct beam search. The resources may comprise a plurality of communication beams to be used for direct beam search between the first UE, or initiating UE, and second UE, or a target UE and/or comprise time and frequency resources with which to perform a direct beam search. With reference to FIG. 12, in one example, the information can be received in call 1226.

In block 1706, the first, or initiating, UE 1202 and a second, or target, UE 1204 perform direct beam search using the time and frequency resources that were previously scheduled. With reference to FIG. 12, in one example, the direct beam search can be performed during calls 1232 and 1234. The result of the direct beam search provides information relating to communication beams that may be available to the first, or initiating, UE 1202 and the second, or target, UE 1204 for direct communication.

Figure 18:
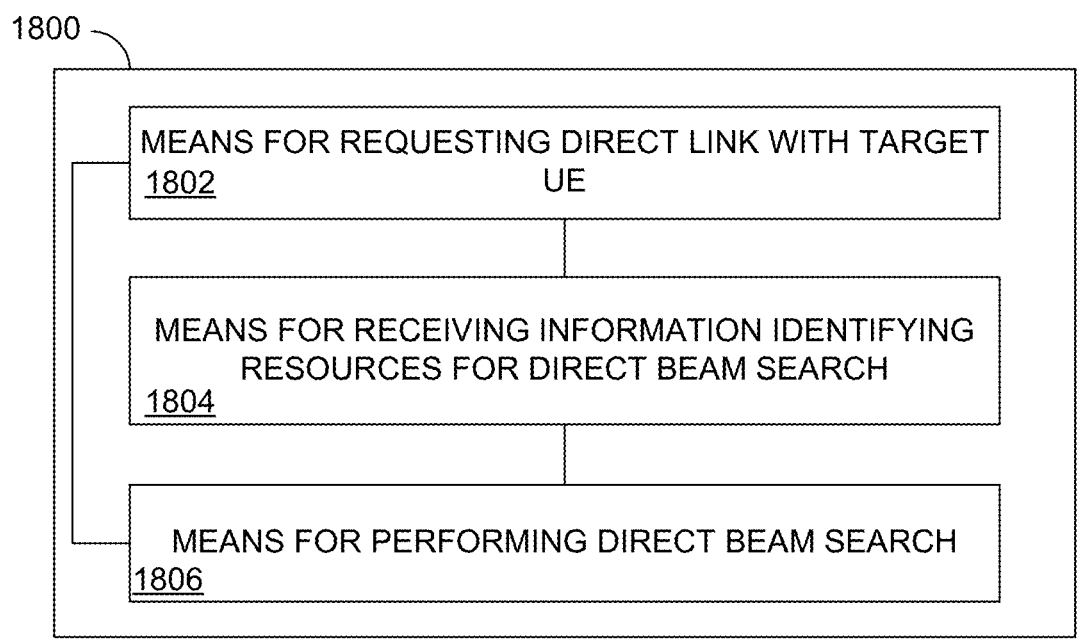
FIG. 18 is a functional block diagram of an apparatus for a communication system in accordance with various aspects of the present disclosure.

FIG. 18 is a functional block diagram of an apparatus 1800 for a communication system in accordance with various aspects of the present disclosure. The apparatus 1800 comprises means 1802 for requesting a direct communication link with a second, or target, UE. In certain embodiments, the means 1802 for requesting a direct communication link with a second, or target UE can be configured to perform one or more of the functions described in operation block 1702 of method 1700 (FIG. 17). In an exemplary embodiment, the means 1802 for requesting a direct communication link with a second, or target, UE may comprise a first, or initiating, UE 1202 sending the request to a first base station 1206 (gNB1) with which the first, or initiating, UE 1202 is in communication. In an exemplary embodiment, the antenna 712, RFIC 733, processor 736, memory 739, and direct beam search notification logic 752 in a UE 115 (FIG. 7) may cooperate to send the request; and the antenna 612, RFIC 633, processor 636, memory 637 and direct beam search notification logic 652 in a base station 105 (FIG. 6) may cooperate to receive and process the request.

The apparatus 1800 further comprises means 1804 for receiving information identifying resources for direct beam search. In certain embodiments, the means 1804 for receiving information identifying resources for direct beam search can be configured to perform one or more of the functions described in operation block 1704 of method 1700 (FIG.

17). In an exemplary embodiment, the means 1804 for receiving information identifying resources for direct beam search may comprise the first, or initiating, UE 1202 receiving scheduling information from a first base station 1206 (gNB1). In an exemplary embodiment, the antenna 712, RFIC 733, processor 736, memory 737 and direct beam search scheduling logic 754 in the first UE 115 (FIG. 7) may cooperate to receive and schedule communication resources for direct beam search.

The apparatus 1800 further comprises means 1806 for performing direct beam search. In certain embodiments, the means 1806 for performing direct beam search can be configured to perform one or more of the functions described in operation block 1706 of method 1700 (FIG. 17). In an exemplary embodiment, the means 1806 for performing direct beam search may comprise the first, or initiating, UE 1202 and the second, or target, UE 1204 performing direct beam search using the communication beams and/or time and frequency resources that were previously scheduled. In an exemplary embodiment, the antenna 712, RFIC 733, processor 736, memory 737 and direct beam search performance logic 754 in a first UE 115 (FIG. 7) may cooperate to perform a direct beam search with a second UE 115; and the antenna 712, RFIC 733, processor 736, memory 737 and direct beam search performance logic 756 in the second UE 115 may cooperate to perform a direct beam search with a first UE 115.

Figure 19:
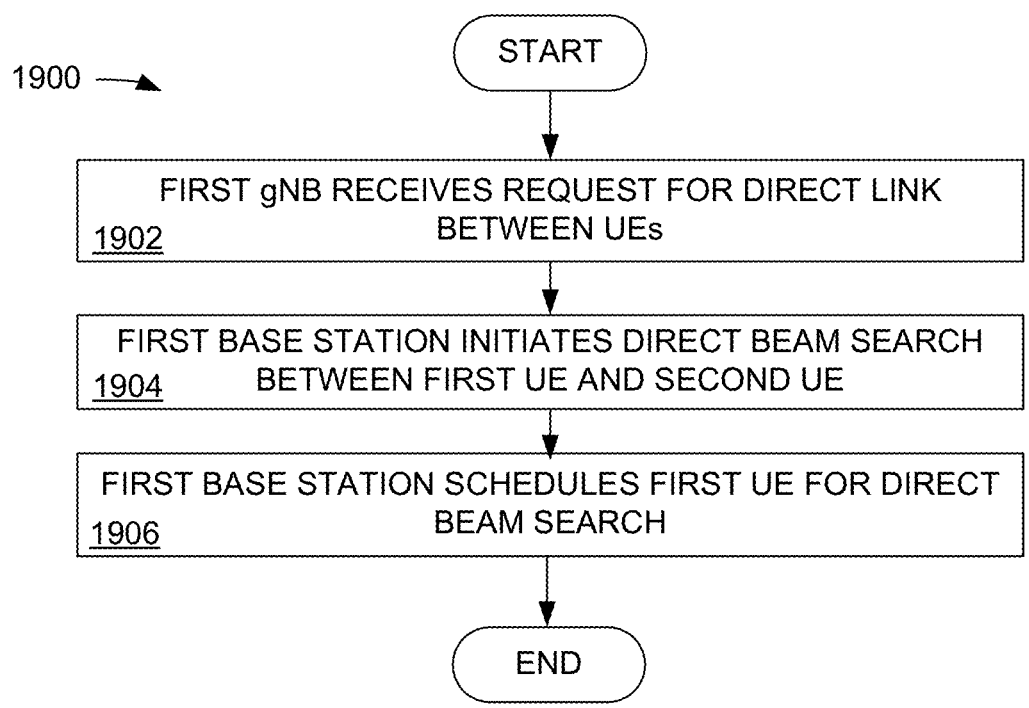
FIG. 19 is a flow chart illustrating an example of a method for communication, in accordance with various aspects of the present disclosure.

FIG. 19 is a flow chart illustrating an example of a method for communication, in accordance with various aspects of the present disclosure. The blocks in the method 1900 can be performed in or out of the order shown, and in some embodiments, can be performed at least in part in parallel.

In block 1902, a first base station 1206 (gNB1) receives a request for a direct communication link between a first UE 1202 and a second UE 1204. The request may be sent by the first UE 1202.

In block 1904, the first base station 1206 (gNB1) initiates direct beam search between the first UE 1202 and a second UE 1204. In an exemplary embodiment, the first base station 1206 (gNB1) sends a communication to a second base station 1208 (gNB2) to initiate direct beam search between the first UE 1202 and the second UE 1204 and may include the first base station 1206 (gNB1) determining with the second base station 1208 (gNB2) the resources for the first UE 1202 and the second UE 1204 to use for direct beam search.

In block 1906, the first base station 1206 (gNB1) schedules time and frequency resources for the first UE 1202 to use for direct beam search.

Figure 20:
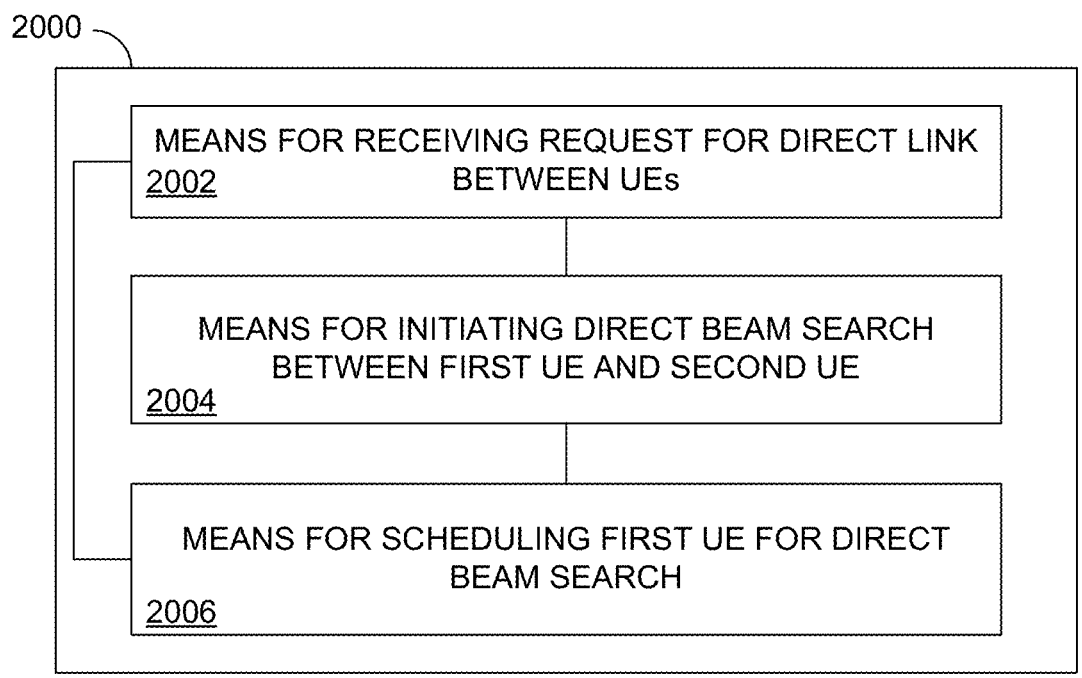
FIG. 20 is a functional block diagram of an apparatus for a communication system in accordance with various aspects of the present disclosure.

FIG. 20 is a functional block diagram of an apparatus 2000 for a communication system in accordance with various aspects of the present disclosure. The apparatus 2000 comprises means 2002 for receiving a request for a direct communication link between UEs. In certain embodiments, the means 2002 for receiving a request for a direct communication link between UEs can be configured to perform one or more of the functions described in operation block 1902 of method 1900 (FIG. 19). In an exemplary embodiment, the means 2002 for receiving a request for a direct communication link between UEs may comprise a first base station 1206 (gNB1) receiving a request from a first UE 1202 for a direct communication link with a second UE 1204. In an exemplary embodiment, the antenna 612, RFIC 633, processor 636, memory 637 and direct beam search notification logic 652 in a base station 105 (FIG. 6) may cooperate to receive and process the request.

The apparatus 2000 further comprises means 2004 for initiating a direct beam search between a first UE and a second UE. In certain embodiments, the means 2004 for initiating a direct beam search between a first UE and a second UE can be configured to perform one or more of the functions described in operation block 1904 of method 1900 (FIG. 19). In an exemplary embodiment, the means 2004 for initiating a direct beam search between a first UE and a second UE may comprise the first base station 1206 (gNB1) informing the second base station 1208 (gNB2) of the desire of the first UE 1202 to communicate directly with the second UE 1204 and may include the first base station 1206 (gNB1) determining with the second base station 1208 (gNB2) the resources for the first UE 1202 and the second UE 1204 to use for direct beam search. In an exemplary embodiment, the antenna 612, RFIC 633, processor 636, memory 637 and direct beam search notification logic 652 in a base station 105 (FIG. 6) may cooperate to initiate the request; and the antenna 612, RFIC 633, processor 636, memory 637 and direct beam search notification logic 652 in another base station 105 (FIG. 6) may cooperate to receive and process the request.

The apparatus 2000 further comprises means 2006 for scheduling a first UE for direct beam search. In certain embodiments, the means 2006 for scheduling a first UE for direct beam search can be configured to perform one or more of the functions described in operation block 1906 of method 1900 (FIG. 19). In an exemplary embodiment, the means 2006 for scheduling a first UE for direct beam search may comprise the first base station 1206 (gNB1) transmitting scheduling information including time and frequency resources to a first UE 1202. In an exemplary embodiment, the antenna 612, RFIC 633, processor 636, memory 637 and direct beam search scheduling logic 654 in a first base station 105 (FIG. 6) may cooperate to schedule resources for a first UE 115; and the antenna 712, RFIC 733, processor 736, memory 737 and direct beam search scheduling logic 754 in the first UE 115 (FIG. 7) may cooperate to schedule resources.

FIG. 21 is a flow chart illustrating an example of a method for communication, in accordance with various aspects of the present disclosure. The blocks in the method 2100 can be performed in or out of the order shown, and in some embodiments, can be performed at least in part in parallel.

In block 2102, a second, or target, UE 1204 receives notification of a request for a direct communication link with a first, or initiating, UE 1202. The notification of the request may be forwarded to the second, or target, UE 1024 from a second base station 1208 (gNB2). With reference to FIG. 12, in one example, the notification may be received in call 1216.

In block 2104, a second, or target, UE 1204 (UE2) sends its direct communication link capability. For example, the second, or target, UE 1204 (UE2) sends its direct communication link capability to a serving base station (gNB2). For example, the second, or target, UE 1204 (UE2) sends this information to the second base station 1208 (gNB2). With reference to FIG. 12, in one example, the information may be sent in call 1218.

In block 2106, the second, or target, UE 1204 receives information identifying resources for direct beam search. The resources may comprise a plurality of communication beams, and/or time and frequency resources with which to perform a direct beam search. With reference to FIG. 12, in one example, the information may be received in call 1228.

In block 2108, the second, or target, UE 1204 and a first, or initiating, UE 1202 perform direct beam search using the communication beam and/or time and frequency resources that were previously scheduled. With reference to FIG. 12, in one example, the direct beam search can be performed during calls 1232 and 1234.

Figure 22:
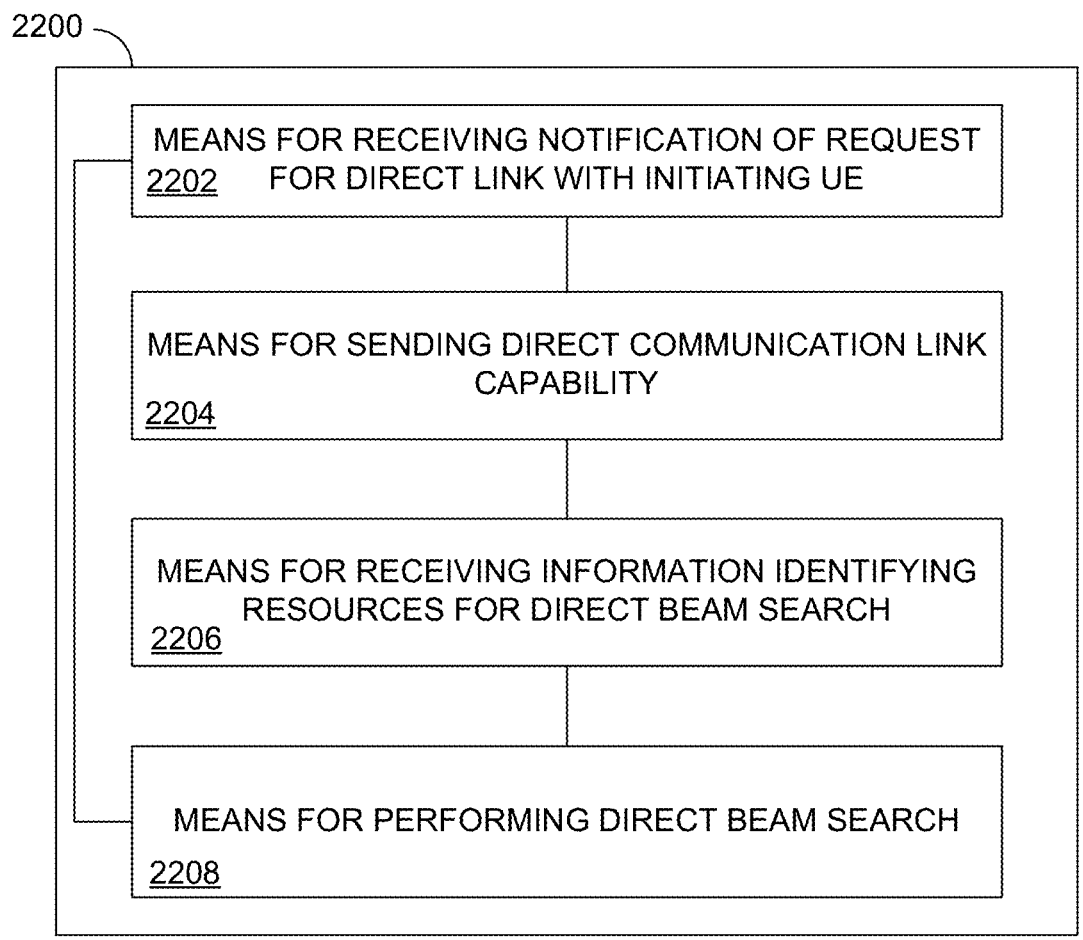
FIG. 22 is a functional block diagram of an apparatus for a communication system in accordance with various aspects of the present disclosure.

FIG. 22 is a functional block diagram of an apparatus 2200 for a communication system in accordance with various aspects of the present disclosure. The apparatus 2200 comprises means 2202 for receiving a notification of a request for a direct communication link with a first, or initiating, UE. In certain embodiments, the means 2202 for receiving a notification of a request for a direct communication link with a first, or initiating, UE can be configured to perform one or more of the functions described in operation block 2102 of method 2100 (FIG. 21). In an exemplary embodiment, the means 2202 for receiving a notification of a request for a direct communication link with a first, or initiating UE 1202 may comprise a second, or target, UE 1204 receiving a notification from a second base station 1208 (gNB2) that a first, or initiating, UE 1202 is requesting establishment of a direct communication link. In an exemplary embodiment, the antenna 712, RFIC 733, processor 736, memory 739, and direct beam search notification logic 752 in a UE 115 (FIG. 7) may cooperate to receive the notification of the request.

The apparatus 2200 further comprises means 2204 for sending direct communication link capability. In certain embodiments, the means 2204 for sending direct communication link capability can be configured to perform one or more of the functions described in operation block 2104 of method 2100 (FIG. 21). In an exemplary embodiment, the means 2204 for sending direct communication link capability may comprise the second, or target, UE 1204 sending its capability for direct link communication to a second base station 1208 (gNB2). In an exemplary embodiment, the antenna 712, RFIC 733, processor 736, memory 737 and direct beam search performance logic 756 in the second UE 115 (FIG. 7) may cooperate to send its capability for performing direct beam search.

The apparatus 2200 further comprises means 2206 for receiving information identifying resources for direct beam search. In certain embodiments, the means 2206 for receiving information identifying resources for direct beam search can be configured to perform one or more of the functions described in operation block 2106 of method 2100 (FIG. 21). In an exemplary embodiment, the means 2206 for receiving information identifying resources for direct beam search may comprise the second, or target, UE 1204 receiving scheduling information from a second base station 1208 (gNB2). In an exemplary embodiment, the antenna 712, RFIC 733, processor 736, memory 737 and direct beam search scheduling logic 754 in the second UE 115 (FIG. 7) may cooperate to receive and schedule communication resources for direct beam search.

The apparatus 2200 further comprises means 2208 for performing direct beam search. In certain embodiments, the means 2208 for performing direct beam search can be configured to perform one or more of the functions described in operation block 2108 of method 2100 (FIG. 21). In an exemplary embodiment, the means 2208 for performing direct beam search may comprise the first, or initiating, UE 1202 and the second, or target, UE 1204 performing direct beam search using the communication beams and/or time and frequency resources that were previously scheduled. In an exemplary embodiment, the antenna 712, RFIC 733, processor 736, memory 737 and direct beam search performance logic 756 in a second UE 115 (FIG. 7) may cooperate to perform a direct beam search with a first UE 115; and the processor 736, memory 737 and direct beam search performance logic 756 in the first UE 115 may cooperate to perform a direct beam search with a second UE 115.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.), such as the components shown in the base stations and UEs of FIG. 5, FIG. 6 and FIG. 7. It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication by an initiating communication device (UE1), comprising:
transmitting, by the UE1 to a serving base station of the UE1, a request to establish a direct link communication with a target communication device (UE2), the request comprising information relating to a capability of the UE1 for direct link communication, and information identifying the UE2 as a communication device capable of direct link communication with the UE1, the UE1 obtaining the information identifying the UE2 directly from the UE2;

receiving information identifying a plurality of communication beams to be used for direct beam search between the UE1 and the UE2, wherein the information identifying the plurality of communication beams to be used for direct beam search between the UE1 and the UE2 is determined based on information exchanged between the serving base station of the UE1 and a serving base station of the UE2; and performing direct beam search with the UE2.

2. The method of claim 1, further comprising:

based on the direct beam search, generating a beam search report having at least a beam ID of a selected communication beam of the UE2; and sending the beam search report to the serving first base station of the UE1.

3. The method of claim 2, wherein the beam search report further comprises:

an identification of communication beams that can be used by the UE1 and the UE2; and at least one of RSRP (reference signal received power), SINR (signal to interference and noise ratio), SNR (signal to noise ratio), interference, and delay spread of the identified communication beams.

4. The method of claim 1, further comprising receiving an ID of at least one transmit beam and at least one receive beam from the plurality of communication beams, the transmit beam and the receive beam forming a beam pair for direct link communication between the UE1 and the UE2 after performing the direct beam search.

5. The method of claim 1, further comprising receiving resources to use for direct beam search comprising time and frequency resources for the UE1 and the UE2.

6. The method of claim 1, wherein the request to establish a direct link communication further comprises one or more of:

identification of communication beams available to the UE1;

beam properties of the communication beams available to the UE1;

transmission capability of the UE1;

or any combination thereof.

7. The method of claim 1, wherein the frequency with which the direct beam search is performed is dynamically adjusted based on changing channel conditions.

8. The method of claim 1, wherein the plurality of communication beams to be used for the direct beam search are determined by the serving base station of the UE1 and the serving base station of the UE2 based at least on the request and on one or more capabilities of the UE1 and the UE2.

9. A method for communication by a target communication device (UE2), comprising:

receiving a notification of a request for a direct link communication with an initiating communication device (UE1), the UE1 obtaining information identifying the UE2 directly from the UE2;

sending direct communication link capability of the UE2 to a serving base station of the UE2 as a communication device capable of direct link communication with the UE1;

receiving information identifying a plurality of communication beams to be used for the direct beam search with the UE1, wherein the information identifying the plurality of communication beams to be used for direct beam search with the UE1 is determined based on information exchanged between a serving base station of the UE1 and the serving base station of the UE2; and performing direct beam search with the UE1.

10. The method of claim 9, further comprising receiving a beam search report having at least a beam ID of a selected communication beam, the beam search report based on the direct beam search.

11. The method of claim 9, further comprising receiving time and frequency resources for the UE1 and the UE2 to use for direct beam search.

12. The method of claim 9, wherein the request to establish a direct link communication further comprises one or more of:

identification of communication beams available to the UE1;

beam properties of the communication beams available to the UE1;

transmission capability of the UE1;

or any combination thereof.

13. The method of claim 10, wherein the beam search report further comprises:

an identification of communication beams that can be used by the UE1 and the UE2 for the direct communication link; and at least one of RSRP (reference signal received power), SINR (signal to interference and noise ratio), SNR (signal to noise ratio), interference, and delay spread of the identified communication beams.

14. An apparatus for communication, comprising:

a memory in an initiating communication device (UE1);

a processor in the UE1;

the memory and the processor of the initiating communication device (UE1) configured to:

transmit, by the UE1 to a serving base station of the UE1, a request to establish a direct link communication with a target communication device (UE2), the request comprising information relating to a capability of the UE1 for direct link communication, and information identifying the UE2 as a communication device capable of direct link communication with the UE1, the UE1 obtaining the information identifying the UE2 directly from the UE2;

receive information identifying a plurality of communication beams to be used for direct beam search between the UE1 and the UE2, wherein the information identifying the plurality of communication beams to be used for direct beam search between the UE1 and the UE2 is determined based on information exchanged between the serving base station of the UE1 and a serving base station of the UE2; and perform direct beam search with the UE2.

15. The apparatus of claim 14, further comprising:

based on the direct beam search, the memory and the processor of the UE1 configured to generate a beam search report having at least a beam ID of a selected communication beam of the UE2; and the memory and the processor of the UE1 configured to send the beam search report to the serving base station of the UE1.

16. The apparatus of claim 15, wherein the beam search report further comprises:

an identification of communication beams that can be used by the UE1 and the UE2; and at least one of RSRP (reference signal received power), SINR (signal to interference and noise ratio), SNR (signal to noise ratio), interference, and delay spread of the identified communication beams.

17. The apparatus of claim 14, further comprising the memory and the processor of the UE1 configured to receive an ID of at least one transmit beam and at least one receive beam from the plurality of communication beams, the transmit beam and the receive beam forming a beam pair for direct link communication between the UE1 and the UE2 after performing the direct beam search.

18. The apparatus of claim 14, further comprising the memory and the processor of the UE1 configured to receive resources to use for direct beam search comprising time and frequency resources for the UE1 and the UE2.

19. The apparatus of claim 14, wherein the request to establish a direct link communication further comprises one or more of:
 identification of communication beams available to the UE1;
 beam properties of the communication beams available to the UE1;
 transmission capability of the UE1;
 or any combination thereof.

20. The apparatus of claim 14, wherein the frequency with which the direct beam search is performed is dynamically adjusted based on changing channel conditions.

21. The apparatus of claim 14, wherein the plurality of communication beams to be used for the direct beam search are determined by the serving base station of the UE1 and the serving base station of the UE2 based at least on the request and on one or more capabilities of the UE1 and the UE2.

22. An apparatus for communication, comprising:
 a memory in a target communication device (UE2);
 a processor in the UE2;
 the memory and the processor of the UE2 configured to:
  receive a notification of a request for a direct link communication with an initiating communication device (UE1), the UE1 obtaining information identifying the UE2 directly from the UE2;
  send direct communication link capability of the UE2 to a serving base station of the UE2 as a communication device capable of direct link communication with the UE1;
  receive information identifying a plurality of communication beams to be used for the direct beam search with the UE1, wherein the information identifying the plurality of communication beams to be used for direct beam search with the UE1 is determined based on information exchanged between a serving base station of the UE1 and the serving base station of the UE2; and
  perform direct beam search with the UE1.

23. The apparatus of claim 22, further comprising the memory and the processor of the UE2 configured to receive a beam search report having at least a beam ID of a selected communication beam, the beam search report based on the direct beam search.

24. The apparatus of claim 22, further comprising the memory and the processor of the UE2 configured to receive time and frequency resources for the UE1 and the UE2 to use for direct beam search.

25. The apparatus of claim 22, wherein the request to establish a direct link communication further comprises one or more of:
 identification of communication beams available to the UE1;
 beam properties of the communication beams available to the UE1;
 transmission capability of the UE1;
 or any combination thereof.

26. The apparatus of claim 23, wherein the beam search report further comprises:
 an identification of communication beams that can be used by the UE1 and the UE2 for the direct communication link; and
 at least one of RSRP (reference signal received power), SINR (signal to interference and noise ratio), SNR (signal to noise ratio), interference, and delay spread of the identified communication beams.

* * * * *